US010073905B2

(12) United States Patent
Skrobotov

(10) Patent No.: US 10,073,905 B2
(45) Date of Patent: Sep. 11, 2018

(54) REMOTE CONTROL AND MODIFICATION OF LIVE PRESENTATION

(71) Applicant: Microsoft Technology Licensing, LLC, Redmond, WA (US)

(72) Inventor: Sergey Skrobotov, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 14/312,384

(22) Filed: Jun. 23, 2014

(65) Prior Publication Data

US 2015/0350029 A1 Dec. 3, 2015

Related U.S. Application Data

(60) Provisional application No. 62/005,994, filed on May 30, 2014.

(51) Int. Cl.

| *G06F 3/048* | (2013.01) |
|---|---|
| *G06F 3/0484* | (2013.01) |
| *G06F 17/30* | (2006.01) |
| *H04L 12/18* | (2006.01) |
| *H04N 21/432* | (2011.01) |

(Continued)

(52) U.S. Cl.
CPC .... *G06F 17/30598* (2013.01); *G06F 3/04842* (2013.01); *G06F 17/30398* (2013.01); *G09B 5/00* (2013.01); *H04L 41/22* (2013.01); *H04L 67/42* (2013.01); *H04N 21/4325* (2013.01); *H04N 21/472* (2013.01); *H04N 21/4758* (2013.01); *H04N 21/4788* (2013.01); *G06F 3/048* (2013.01); *H04L 12/18* (2013.01);

(Continued)

(58) Field of Classification Search
CPC .. G06F 3/048; G06F 3/4842; G06F 17/30598; G06F 17/30398; H04L 65/403; H04L 12/1822; H04L 12/1813; H04L 12/18; H04L 41/22; H04L 67/42; G09B 5/00; H04N 21/4325; H04N 21/472; H04N 21/4758; H04N 21/4785
USPC ............... 715/755, 732, 731, 730, 753, 751
See application file for complete search history.

(56) References Cited

U.S. PATENT DOCUMENTS

| 6,532,218 B1 | 3/2003 | Shaffer et al. |
|---|---|---|
| 7,363,643 B2 | 4/2008 | Drake et al. |

(Continued)

FOREIGN PATENT DOCUMENTS

| CN | 106537927 A | 3/2017 |
|---|---|---|
| EP | 0632659 A2 | 1/1995 |

(Continued)

OTHER PUBLICATIONS

"International Application Serial No. PCT/US2015/022955, International Search Report dated Nov. 19, 2015", 7 pgs.

(Continued)

*Primary Examiner* — Ting Lee
(74) *Attorney, Agent, or Firm* — Schwegman Lundberg & Woessner, P.A.

(57) ABSTRACT

A system and method for controlling and modifying a live presentation are disclosed. A server system transmits presentation data to a presentation device for display. While transmitting the presentation data to the presentation device for display, the system receives one or more presentation interactions. The system then transmits each interaction stored in the interaction queue to the presentation device.

20 Claims, 18 Drawing Sheets

(51) Int. Cl.

| | | |
|---|---|---|
| *H04N 21/472* | (2011.01) | |
| *H04N 21/475* | (2011.01) | |
| *H04N 21/478* | (2011.01) | |
| *H04L 12/24* | (2006.01) | |
| *H04L 29/06* | (2006.01) | |
| *G09B 5/00* | (2006.01) | |
| *H04N 21/4788* | (2011.01) | |

(52) U.S. Cl.
CPC ...... *H04L 12/1813* (2013.01); *H04L 12/1822* (2013.01); *H04L 65/403* (2013.01)

(56) References Cited

U.S. PATENT DOCUMENTS

| | | | |
|---|---|---|---|
| 7,699,706 | B2 | 4/2010 | Walker et al. |
| 7,708,635 | B2 | 5/2010 | Walker et al. |
| 7,806,761 | B2 | 10/2010 | Walker et al. |
| 7,824,258 | B2 | 11/2010 | Walker et al. |
| 8,006,259 | B2 | 8/2011 | Drake et al. |
| 8,038,523 | B2 | 10/2011 | Walker et al. |
| 8,047,908 | B2 | 11/2011 | Walker et al. |
| 8,887,052 | B1 * | 11/2014 | Young ................ H04L 12/1822 709/205 |
| 9,033,785 | B2 | 5/2015 | Walker et al. |
| 9,754,011 | B2 | 9/2017 | Skrobotov |
| 2002/0078063 | A1 | 6/2002 | Minder |
| 2002/0078441 | A1 | 6/2002 | Drake et al. |
| 2005/0066089 | A1 | 3/2005 | Karaoguz et al. |
| 2006/0246972 | A1 | 11/2006 | Thomas et al. |
| 2007/0294740 | A1 | 12/2007 | Drake et al. |
| 2008/0270541 | A1 | 10/2008 | Keener et al. |
| 2010/0174783 | A1 * | 7/2010 | Zarom .................... G06F 9/526 709/205 |
| 2012/0054660 | A1 * | 3/2012 | Marusich ............... G06F 3/048 715/772 |
| 2012/0185291 | A1 * | 7/2012 | Ramaswamy ..... G06Q 10/1095 705/7.19 |
| 2014/0136098 | A1 | 5/2014 | Stroila et al. |
| 2015/0347560 | A1 | 12/2015 | Skrobotov |

FOREIGN PATENT DOCUMENTS

| | | |
|---|---|---|
| EP | 1043894 A2 | 10/2000 |
| IN | 201617044509 A | 4/2017 |
| WO | WO-0219717 A2 | 3/2002 |
| WO | WO-2002019717 A2 | 3/2002 |
| WO | WO-03015056 A2 | 2/2003 |
| WO | WO-2012129533 A2 | 9/2012 |
| WO | WO-2015183397 A1 | 12/2015 |

OTHER PUBLICATIONS

"International Application Serial No. PCT/US2015/022955, Written Opinion dated Nov. 19, 2015", 8 pgs.

"U.S. Appl. No. 14/312,404, Non Final Office Action dated Jun. 22, 2016", 11 pgs.

"U.S. Appl. No. 14/312,404, Notice of Allowance dated Jan. 13, 2017", 6 pgs.

"U.S. Appl. No. 14/312,404, Notice of Allowance dated Apr. 28, 2017", 6 pgs.

"U.S. Appl. No. 14/312,404, Response filed Nov. 22, 2016 to Non Final Office Action dated Jun. 22, 2016", 13 pgs.

"U.S. Appl. No. 14/312,404, Supplemental Response filed Apr. 11, 2017 to Non Final Office Action dated Jun. 22, 2016 and NOA dated Jan. 13, 2017", 8 pgs.

"International Application Serial No. PCT/US2015/022955, International Preliminary Report on Patentability dated Dec. 15, 2016", 10 pgs.

"International Application Serial No. PCT/US2015/022955, Invitation to Pay Additional Fees and Partial Search Report dated Jul. 16, 2015", 6 pgs.

"European Application No. 15720131.0, Communciation Pursuant to Article 94(3) EPC dated Jun. 12, 2017", 6 pgs.

"European Application No. 15720131.0, Communication Pursuant to Article 94(3) EPC dated Nov. 27, 2017", 4 pgs.

"European Application No. 15720131.0, Response filed Feb. 7, 2018 to Communication Pursuant to Article 94(3) EPC dated Nov. 27, 2017", 105 pgs.

"European Application No. 15720131.0, Response filed Aug. 21, 2017 to Communication Pursuant to Article 94(3) EPC dated Jun. 12, 2017", 13 pgs.

"European Application Serial No. 15720131.0, Summons to Attend Oral Proceedings dated Jul. 9, 2018", 7 pgs.

\* cited by examiner

450

AND GATE

- THE AND GATE IMPLEMENTS THE BOOLEAN AND FUNCTION WHERE THE OUTPUT IS ONLY LOGICAL 1 WHEN ALL INPUTS ARE LOGICAL 1
- THE STANDARD SYMBOL AND THE TRUTH TABLE FOR A TWO INPUT AND GATE IS:

460

OR GATE
- THE OR GATE IMPLEMENTS THE BOOLEAN PR FUNCTION WHERE THE OUTPUT IS ONLY LOGICAL 1 WHEN ALL INPUTS ARE LOGICAL 1
- THE STANDARD SYMBOL AND THE TRUTH TABLE FOR A TWO INPUT OR GATE IS:
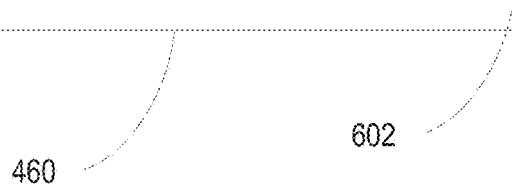
DALLINH ASKS: WHAT IS THE LOGICAL OPPOSITE OF AN OR GATE? (4:22 PM)
460       602
FIGURE 6B

- PRE-ESTABLISHED PRESENTATION 1 902-1
- PRE-ESTABLISHED PRESENTATION 2 902-2
- PRE-ESTABLISHED PRESENTATION 3 902-3
- PRE-ESTABLISHED PRESENTATION 4 902-4
- ...
- PRE-ESTABLISHED PRESENTATION N 902-P

- PRESENTATION ID 904
- PRESENTATION NAME 906
- TOPIC DATA 908
- PRE-ESTABLISHED PRESENTATION DATA 910
- TREND DATA 912
- PRESENTATION EVENT 1 914-1
- PRESENTATION EVENT 2 914-2
- PRESENTATION EVENT 3 914-3
- ...
- PRESENTATION EVENT L 914-Q

- PRESENTATION EVENT ID 916
- INTERACTION QUEUE 918
- PRESENTATION LOCATION 920
- ATTENDEE LIST 922
- PRESENTATION TIME 924
- DEMOGRAPHIC INFORMATION 926
- PRESENTER ID 928
- AUDIO DATA 930

FIGURE 9

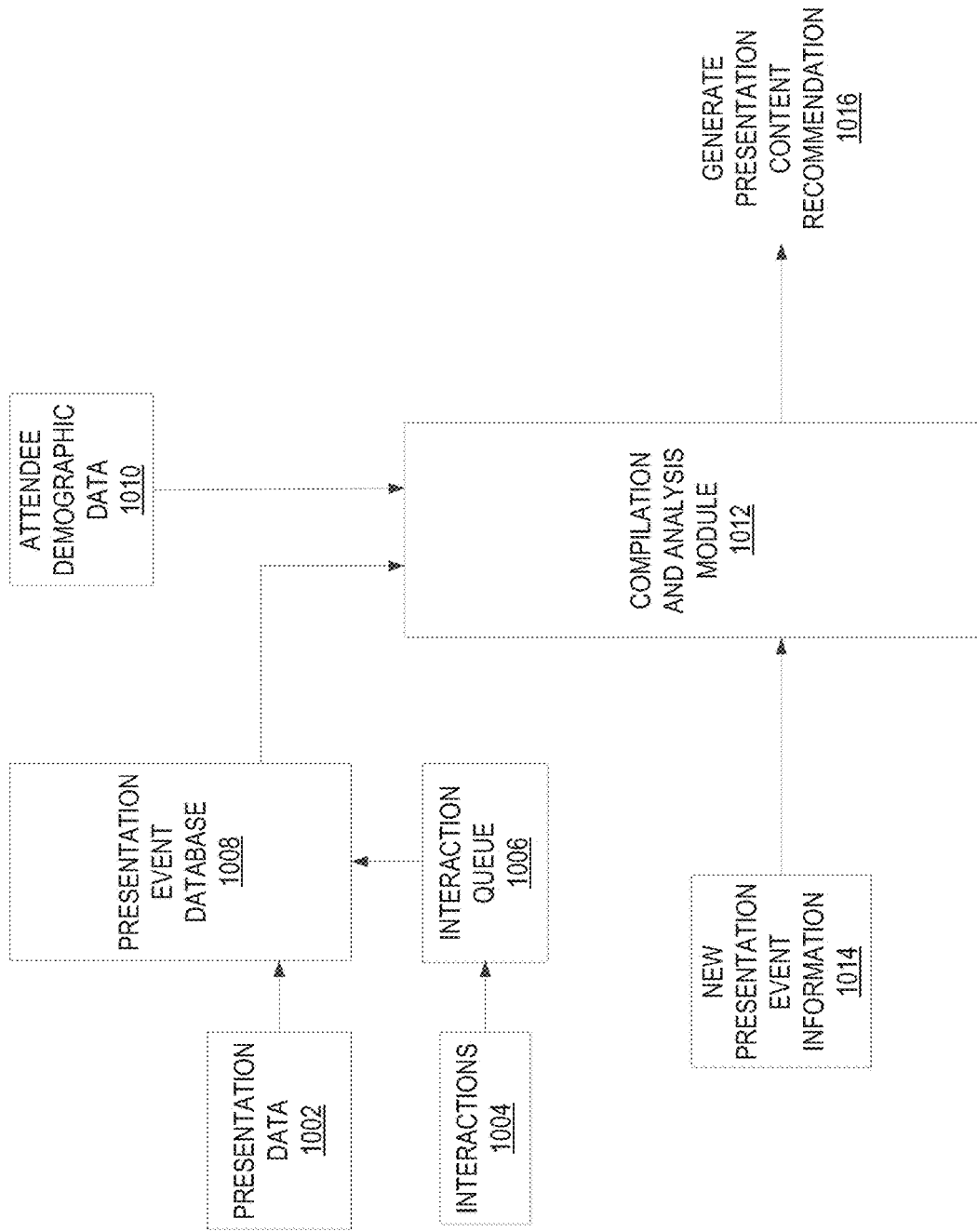

REMOTE CONTROL AND MODIFICATION OF LIVE PRESENTATION

RELATED APPLICATIONS

This application claims the benefit of priority to U.S. Provisional Patent Application Ser. No. 62/005,994, filed on May 30, 2014, the entire contents of which are incorporated herein by reference in their entirety.

TECHNICAL FIELD

The disclosed embodiments relate generally to the field of wireless communication, and in particular to media presentations that use wireless communication.

BACKGROUND

The rise of the computer age has resulted in increased access to services through communication networks. As the costs of electronics and networking services drop, many services that were previously provided in person are now provided remotely over the Internet. For example, entertainment has increasingly shifted to the online space with companies such as Netflix and Amazon streaming TV shows and movies to members at home. Similarly, electronic mail (e-mail) has reduced the need for letters to physically be delivered. Instead, messages are sent over networked systems almost instantly.

Additionally, the reach and speed of the services provided over a network allow near instantaneous communication over great distances. Thus people are able to interact, learn, and work with each other from great distances. In addition, records of these interactions can be stored safely for future use.

DESCRIPTION OF THE DRAWINGS

Some embodiments are illustrated by way of example and not limitation in the Figures of the accompanying drawings, in which:

FIG. 6B is a diagram illustrating an example of a display at a presentation device, according to some embodiments.

FIG. 9 depicts a block diagram of an exemplary data structure for a pre-established presentation database for storing pre-established presentation records in accordance with some embodiments.

FIG. 10 depicts a flow diagram of an exemplary data structure for a pre-established presentation database for storing pre-established presentation records in accordance with some embodiments.

Like reference numerals refer to corresponding parts throughout the drawings.

DETAILED DESCRIPTION

Figure 1:
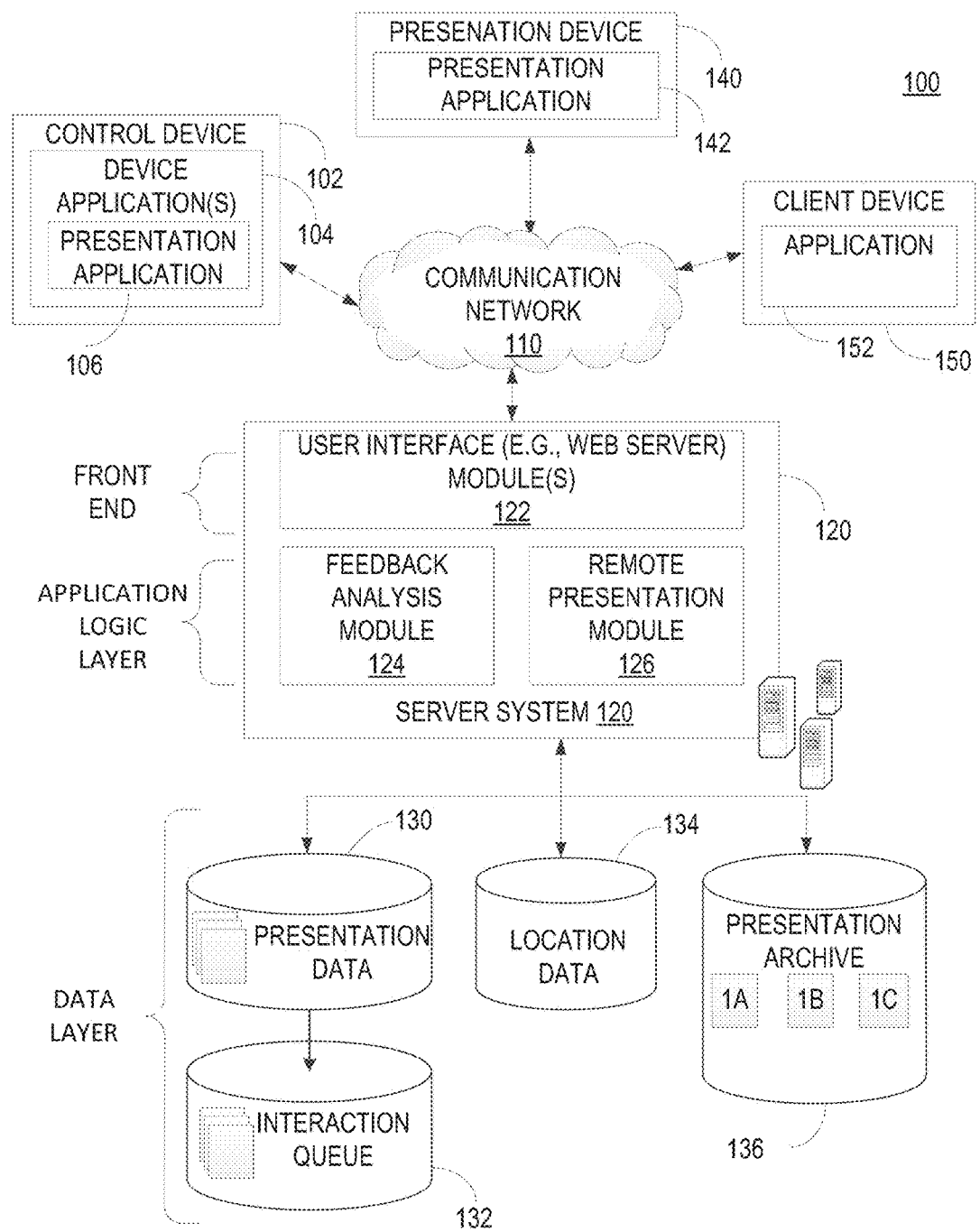
FIG. 1 is a network diagram depicting a client-server system that includes various functional components of a server system in accordance with some embodiments.

The present disclosure describes methods, systems and computer program products for remotely controlling live presentations, modifying a live presentation, and storing presentation data for each live event. In the following description, for purposes of explanation, numerous specific details are set forth to provide a thorough understanding of the various aspects of different embodiments. It will be evident, however, to one skilled in the art, that any particular embodiment may be practiced without all of the specific details and/or with variations permutations and combinations of the various features and elements described herein.

For a given presentation, a presenter has a control device, which is used to control the presentation, and the presentation is actually presented by a second device (e.g., a presentation device). Traditionally, these two devices have been either the same device (e.g., a laptop) or are part of the same system (e.g., a projector connected to a laptop). However, consistent with some embodiments of the present inventive subject matter, the control device is a device that communicates with a server system. The server system is then connected (e.g., via a communication network) to the presentation device. In some example embodiments, the control device is connected to the presentation device via a local wireless network (e.g., via Wi-Fi, etc.) without connecting through a server. In this case, the server functionality is provided by the control device, the presentation device, or a combination thereof.

The server system mediates between the control device (e.g., the control device used by the presenter), the presentation device, and all other devices that are associated with a particular presentation (e.g., the devices of users viewing or attending the presentation). The control device receives input (e.g., commands to control the presentation) from the presenter and creates interactions based on the input. For example, the presenter selects the "next slide" button, and the presenter device creates an interaction that instructs the presentation device to move to the next slide.

Each interaction is received by the server system (or the device acting in the place of a server system when on a local area network) and placed in an interaction queue. Each interaction is placed in the interaction queue in the order that it arrived at the server system. The queue generally functions as a first in first out (FIFO) queue, such that all interactions are stored in the order they were received. The interactions are then taken out of the queue and transmitted to the presentation device from the interaction queue, such that the interactions are transmitted to the presentation device in the same order as they arrived at the server system. The presentation device then performs the interactions specified by each interaction it receives. For example, if the presentation device receives a "next page" command interaction that originated at the control device, the presentation device then moves the next slide of the presentation The server system can receive a variety of different types of interactions. Control interactions are interactions that control the presentation itself by determining what is currently presented (e.g., what slide is currently shown), changing or altering content (e.g., the presenter erases a specific example and draws another example in its place), displaying audience participation prompts (e.g., an audience quiz), and other interactions that directly control the presented information.

The server system also receives social interactions. Social interactions typically are sent from participants (e.g., audience members) and include, but are not limited to: a question, a comment, an answer to a survey or quiz, or a message. Each of these interactions are stored in the interaction queue by the server system and then transmitted to the presentation device in the order they were received. In some example embodiments there are separate queues for control interactions and social interactions.

In some example embodiments each device (e.g., the control device, the presentation device, and various client devices associated with audience members) has an associated location (e.g., GPS co-ordinates). The server system uses the location associated with each device to provide better services to the users of the server system. In some example embodiments users can search for presentations close to their current location (or to a given location). In response, the server system determines a list of all current presentations and presentations that are scheduled to begin within a certain period of item (e.g., in the next hour) and are within a predefined distance of the user's location.

In some example embodiments the predefined distance is determined based on information transmitted as part of the user search (e.g., the user selects the maximum distance to consider). In other embodiments, the distance is set based on the time to travel to the location. For example, the server system determines how long it will take for the user to travel to the presentation. If the user would be unable to arrive at the presentation either before it begins or before too much time has elapsed, the presentation is not listed, regardless of what the total distance is.

In some example embodiments the server system can alert a user when a presentation near them is going live. This can be based on user interests. In some example embodiments the interests are received from the user. The server system can also automatically add relevant presentations to a user's calendar.

In some example embodiments the location of a client device determines how the server system processes an interaction. When a user (e.g., a viewer or an attendee) sends a social interaction to the server system, the server system determines the location of the device from which the social interaction was sent. The location associated with the sending device is used in determining how the server system deals with the received social interaction. For example, when a social interaction is received from a client device with an associated location that is within a predefined distance of the presentation device (e.g., within the same room or able to view the presentation) the server system will automatically display the interaction concurrently with the presentation (e.g., the comment or question will pop-up on the presentation display). If the interaction is from a presentation device outside the predefined area, it is only displayed to the user of the control device (e.g., the presenter) or saved in the presentation record without immediate display. Similarly in some embodiments interactions are received from a client system that is on the same local area network as the presentation device. In response the social networking system 120 automatically displays In some example embodiments the server system (e.g., system 120 in FIG. 1) stores a plurality of presentation events (e.g., a specific occurrence of a general presentation). Each presentation event is associated with a particular pre-established presentation. For example, a public speaker may give the same general presentation (with its accompanying slideshow) hundreds of times. Each time the presentation is given, the presentation will vary based on the specific details of the presentation event. The audience, the location, the time of the year, specific local events, and particular questions or comments from the audience all result in specific details being different from presentation to presentation.

The presentation events are generated by recording and logging all the presentation data that is transmitted to the presentation device (e.g., device 140 in FIG. 1). In this way, the stored presentation events are able to completely reproduce the presentation event as it was presented on the presentation device. In some example embodiments, all the presentation information is stored in a log file.

Once a significant number of presentation events have been recorded and stored on the server system, the server system can analyze the data to provide recommendations to improve the pre-established presentations. For example, if the server system has stored 50 specific presentation events for presentation A, the server system can then analyze the recorded presentation data to determine one or more patterns or trends.

The server system first groups (or sorts) the presentation events by the pre-established presentation with which the presentation events are associated. For example, the server system has 120 total presentation events, fifty from presentation A, twenty-five from presentation B, and forty-five from presentation C. The server system groups each presentation event with the other presentation events for the same pre-established presentation. A pre-established presentation includes all the data and media used as visual aids for a specific presentation, such as a slideshow. Although some presentations are only presented once, many presentations are given multiple times to different audiences. Thus, the material that is used to give the presentation is designated as pre-established presentation data, and each recording of an actual presentation is called a presentation event.

Once the presentation events have been grouped appropriately, the server system then analyzes the presentation events for a single pre-established presentation event at a time. The server system compares the presentation data between all the presentation events and determines any patterns, similarities, and aberrations. For example, the server system analyzes fifty presentation events associated with presentation A and determines that in forty-five of the presentation events (e.g., about 90%), one or more attendees or viewers asks the same question on slide number fifteen. The server system will then note this trend and store it in the trend data associated with presentation A.

The server system then stores the trend data for each pre-established presentation. The stored trend/pattern data is then used to give content suggestions for specific pre-established presentations. The content suggestions are delivered when a new presentation event is scheduled. For example, a presenter notifies the server system that they will be presenting presentation A at some point in the future. The server system then uses the saved trend data to give specific content suggestions to the presenter. For example, that about ninety percent of the time, question number one is asked by a presentation attendee when viewing slide number twelve. The server system then will suggest that slide number twelve should include content that answers question number one as part of the pre-established presentation.

In some example embodiments, the presentation event data also includes timing data (e.g., how much time passes between slide changes). This data can then be used to determine when a particular section of the presentations can be improved. For example, presentation C has twenty-two slides and averages about two minutes per slide. However, the server system determines that slide number nineteen averages about fourteen minutes. Based on this, the server system can suggest that slide number nineteen be broken down into two or more separate slides to provide a more even distribution of presentation time.

In some example embodiments, the server system uses demographic information of the audience for a particular presentation event to generate better trend data and to generate more useful suggestions. In some example embodiments, demographic information can be obtained directly from users who are registered with the server system. In other embodiments, the demographic data is estimated based on the location and time of the presentation. For example, for a presentation event with an associated presentation device on Stanford University's campus at 11:00 am, the server system estimates that the audience will largely be English speaking adults between the ages of eighteen and twenty-five. In another example, if the presentation device is located at a pre-school during school hours, the server system estimates that a significant number of the attendees will be children between the ages of three and five.

The server system can then use the demographic data to provide enhanced suggestions to improve the presentation suggestions. Thus, the suggested improvements can be tailored to the estimated audience. For example, an analysis of the presentation event data reveals that adults between the ages of fifty-five and seventy-eight reliably ask questions about Social Security benefits when on slide number twelve of presentation E. As a result, if the server system estimates that a significant portion of the audience for a given presentation event will fit that demographic, the server system suggests enhancing slide number twelve of presentation E to include the answer to this commonly asked question.

FIG. 1 is a network diagram depicting a client-server system 100 that includes various functional components of a server system 120 in accordance with some embodiments. The client-server system 100 includes one or more control devices 102, a server system 120, one or more presentation devices 140, and one or more client devices 150. One or more communication networks 110 interconnect these components. The communication network 110 may be any of a variety of network types, including local area networks (LAN), wide area networks (WAN), wireless networks, wired networks, the Internet, personal area networks (PAN), or a combination of such networks.

In some embodiments a control device 102 is an electronic device with one or more processors, such as a smartphone, a tablet, a mobile phone, a laptop, or any other electronic device capable of communication with a communication network 110. The control device 102 includes one or more device applications 104, which are executed by the control device 102. In some embodiments, the device application(s) 104 includes one or more applications from the set consisting of search applications, communication applications, productivity applications, game applications, word processing applications, or any other useful applications. The device application(s) 104 include a presentation application 106. The control device 102 uses the presentation application 106 to communicate interactions to the server system 120.

The control device 102 transmits interactions (command and social) to the server system 120. Each interaction has an intended target presentation device 140 (e.g., the device that is currently presenting the presentation) and is replayed on the specified presentation device 140 to control a presentation occurring at the presentation device 140. In addition, the presentation application 106 also receives interactions from the server system 120 that have been relayed from one or more client devices 150 (e.g., comments or questions from users viewing the presentation). For example, a control device 102 is being used by a user to control Presentation A at a separate location (e.g., a presentation at a distant university). The control device 102 sends control interactions to the server system 120 which are then replayed on a presentation device 140. The client device 150 sends social interactions that are associated with Presentation A to the server system 120 and the server system 120 transmits the received social interactions to the control device 102.

In some embodiments, as shown in FIG. 1, the server system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various embodiments have been omitted from FIG. 1. However, a skilled artisan will readily recognize that various additional functional modules and engines may be used with a server system 120, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the various embodiments are by no means limited to this architecture.

As shown in FIG. 1, the front end consists of a user interface module (e.g., a web server) 122, which receives requests from various client devices 150, and communicates appropriate responses to the requesting client devices 150. For example, the member interface module(s) 122 may receive requests in the form of Hypertext Transport Protocol (HTTP) requests, or other web-based, application programming interface (API) requests. The control device 102 may be executing conventional web browser applications, or applications that have been developed for a specific platform to include any of a wide variety of mobile devices and operating systems.

As shown in FIG. 1, the data layer includes several databases, including databases for storing data for various presentations, including presentation data 130, one or more interaction queues 132, location data 134, and a presentation archive 136.

In some embodiments, presentation data 130 includes all the data needed to display a presentation (e.g., a slideshow, video, or other presentation). A presentation includes pre-set content (e.g., content in a slideshow). For example, slideshow A includes 20 slides, each including specific text for each slide. The slides are transmitted from the server system 120 to a presentation device 140 (or multiple presentation devices) for presentation.

The presentation data 130 also includes an interaction queue 132. The interaction queue 132 includes a list of one or more interactions (e.g., control interactions and social interactions) received from the control device 102 and the one or more client devices 150. Each interaction in the interaction queue 132 represents an interaction of a user with the presentation. This includes control interactions from the presenters, social interactions from one or more users, and any other interaction with a presentation. For example, the presenter can send a control interaction to change the currently displayed slide, edit the presented content, or to pose a question to the audience. An example social interaction includes a question or a comment from a user.

Each interaction is stored in the interaction queue 132 and then transmitted to the presentation device 140, such that the interactions are replayed on the presentation device 140. At least some of the interactions are relayed to the control device 102 that is controlling the presentation.

The server system 120 also stores location data 134 related to each device (e.g., control device 102, presentation device 140, and one or more client devices 150). The location data represents the position of each device, either measured by a location determining device (e.g., a global positioning satellite device) or as self-reported by the user of the device. For example, the presentation device 140 has a location that indicates that presentation device 140 is on Stanford University's campus, in a particular room, based on the GPS coordinates of the presentation device 140. The server system 120 uses the location data 134 to determine the location of devices relative to each other. This enables the server system 120 to alert users when a presentation is beginning or scheduled to begin near them.

The presentation archive 136 includes records of past presentations. When a presentation is presented, the specific presentation is recorded. Thus, all information related to the specific presentation event (e.g., 1A, 1B, or 1C) is recorded, including but not limited to all interactions received from control devices 102 and/or client devices 150, the date of the presentation, the time of the presentation, the location of the presentation, the audience of the presentation, and any additional information needed to fully reconstruct a specific presentation event. For example, presentation 1 is presented multiple times to multiple different audiences. Each presentation event varies based on the specific situation of the presentation (e.g., the questions that get asked, the timing of various control actions, and other differences). Thus, each particular presentation event of presentation 1 (e.g., 1A, 1B, and 1C) is stored separately.

In some embodiments the application logic layer includes various application server modules, including a remote presentation module 126 and a feedback analysis module 124. Individual application server modules are used to implement the functionality associated with various applications, services and features of the server system 120. For instance, a messaging application, such as an email application, an instant messaging application, or some hybrid or variation of the two, may be implemented with one or more application server modules. Similarly, a search engine enabling members to search for and browse member profiles may be implemented with one or more application server modules.

In addition to the various application server modules, the application logic layer includes the remote presentation module 126. As illustrated in FIG. 1, with some embodiments the remote presentation module 126 is implemented as a service that operates in conjunction with various application server modules. For instance, any number of individual application server modules can invoke the functionality of the remote presentation module 126 to include an application server module associated with applications for allowing a user with a control device 102 to remotely control a presentation. However, with various alternative embodiments, the remote presentation module 126 may be implemented as its own application server module such that it operates as a stand-alone application.

With some embodiments, the remote presentation module 126 includes or has an associated publicly available application programming interface (API) that enables third-party applications to invoke the functionality of the remote presentation module 126.

Generally, the remote presentation module 126 receives a notification that a remote presentation is scheduled to be presented. The notification includes the presentation ID (which identifies a pre-set presentation), a presentation device 140, and a time. The remote presentation module 126 then prepares the specific presentation data for the specific presentation event.

Once the presentation data is ready to be presented, the remote presentation module 126 waits to receive command interactions from the control device 102. Each interaction received from the control device 102 is stored in the interaction queue 132. The remote presentation module 126 then pulls interactions from the interaction queue 132 in the order they were placed in the queue (e.g., in a first in first out mode) and transmitted to the presentation device 140 to be replayed. In some example embodiments interactions are also transmitted to the control device 102 (e.g., the device associated with the presenter) such that interactions that originate from one or more client devices 150 are also displayed to the presenter.

In some embodiments the application logic layer also includes a feedback analysis module 124. A feedback analysis module 124 accesses the presentation archive to retrieve feedback information from previous presentation events. For example, for presentation A there are three specific presentation events stored in the presentation archive 136 and pre-set content which is stored in the presentation data 130. The feedback analysis module 124 retrieves feedback data for each of the three presentation events stored in the presentation archive 136. Feedback data for particular presentation events includes, but is not limited to, all comments, questions, survey answers, the timing of the control interactions (e.g., how long the presentation stayed on each particular slide) for the particular presentation, and demographic data about the audience for the particular presentation event.

The feedback analysis module 124 then analyzes the feedback data from specific presentation events. Based on this analysis, the feedback analysis module 124 determines specific suggestions to improve future specific presentation events. For example, if the presentation analysis determines that Question B is asked seventy-five percent of the time for slide C, the feedback analysis module 124 suggests that the pre-set presentation be updated to provide the answer to question B as part of slide C for future presentation events.

In some example embodiments the client-server system 100 includes one or more presentation devices 140. A presentation device 140 can be any electronic device capable of displaying or otherwise presenting a presentation including, but not limited to, a personal computer with a display (e.g., an HD screen), a laptop, a smart phone, a tablet computer, a projector device, or any other electronic device.

The presentation device 140 includes one or more applications. In some example embodiments the one or more presentations includes a presentation application 142. The presentation application 142 receives presentation data 130 for the presentation event from the server system 120. The presentation application 142 then receives interactions (e.g., control and social interactions) and updates the displayed presentation based on the received interactions. The presentation device 140 also has an associated location. In some example embodiments the role of the presentation application 142 is fulfilled by any web browser application that supports JavaScript technology. Thus, the presentation application 142 does not need to be a separate application. Instead it can be a plugin or a web service.

In some example embodiments, the client-server system 100 includes one or more client devices 150. A client device is an electronic device, such as a personal computer, a laptop, a smartphone, a tablet, a mobile phone or any other electronic device capable of communication with a communication network 110. The client device 150 includes one or more client applications 152, which are executed by the client device 150. In some embodiments, the client application(s) 152 includes one or more applications from the set consisting of search applications, communication applications, productivity applications, game applications, word processing applications, or any other useful applications.

Figure 2A:
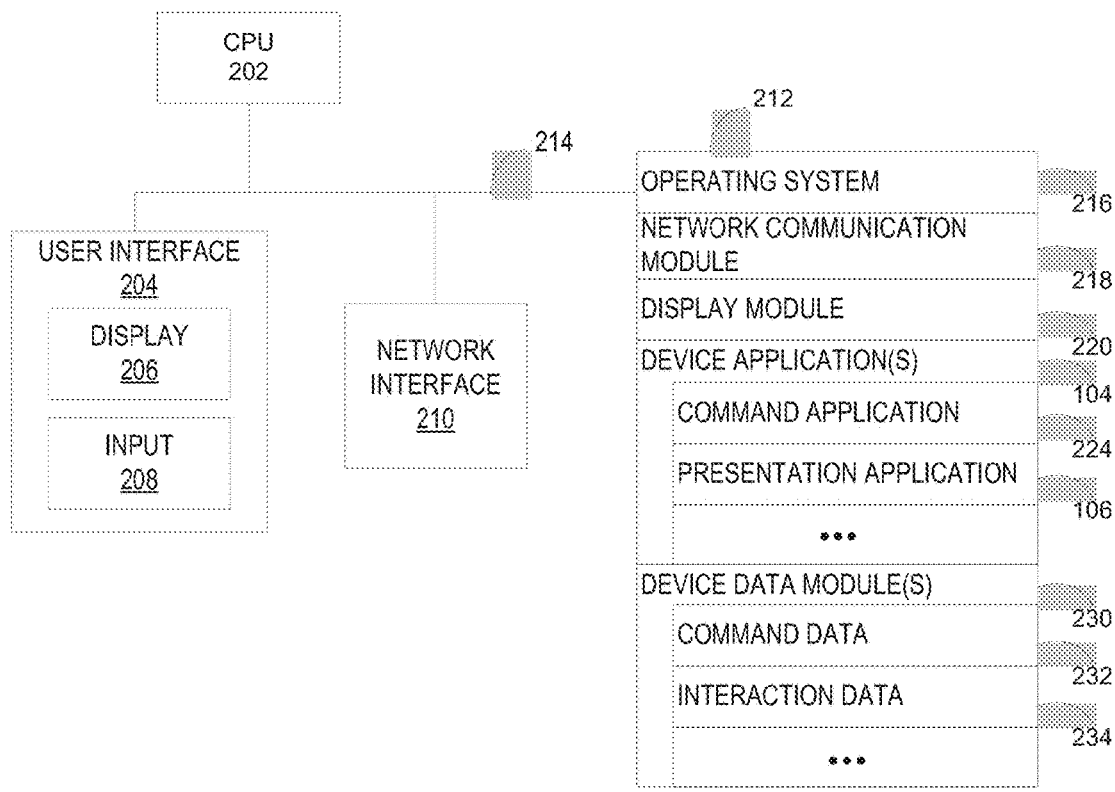
FIG. 2A is a block diagram illustrating a control device in accordance with some embodiments.

FIG. 2A is a block diagram illustrating a control device 102 in accordance with some embodiments. The control device 102 typically includes one or more processing units (CPUs) 202, one or more network interfaces 210, memory 212, and one or more communication buses 214 for interconnecting these components. The control device 102 includes a user interface 204. The member interface 204 includes a display device 206 and optionally includes an input means such as a keyboard, mouse, a touch sensitive display, or other input buttons 208. Furthermore, some control devices 102 use a microphone and voice recognition to supplement or replace the keyboard.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer readable storage medium.

In some embodiments, memory 212 or the computer readable storage medium of memory 212, stores the following programs, modules and data structures, or a subset thereof:
  an operating system 216 that includes procedures for handling various basic system services and for performing hardware dependent tasks;
  a network communication module 218 that is used for connecting the control device 102 to other computers via the one or more communication network interfaces 210 (wired or wireless) and one or more communication networks, such as the Internet, other wide area networks, local area networks, metropolitan area networks, etc.;
  a display module 220 for enabling the information generated by the operating system 216 and device applications 104 to be presented visually on the display device 206;
  one or more device applications 104 for handling various aspects of interacting with the server system 120 (FIG. 1), including but not limited to:
    a command application 224 for sending command interactions to the server system 120 to control the content being displayed at a presentation device (e.g., presentation device 140), wherein control interactions include instructions to begin a specific presentation event, change the content being displayed (e.g., changing the current display slide or video), edit the content being displayed, send questions to presentation attendees, and end a presentation; and
    a presentation application 106 for receiving presentation information from the server system 120 including interactions from the interaction queue 132 as seen in FIG. 1;
  a device data module 230, for storing data relevant to the control device 102, including but not limited to:
    command data 232 for storing command data interactions that are intended to be sent to the server system 120 to control a particular presentation;
    interaction data 234 for storing one or more interactions (e.g., social interactions from client devices (e.g., device 150 as seen in FIG. 1)) received from the server system (e.g., system 120 in FIG. 1).

Figure 2B:
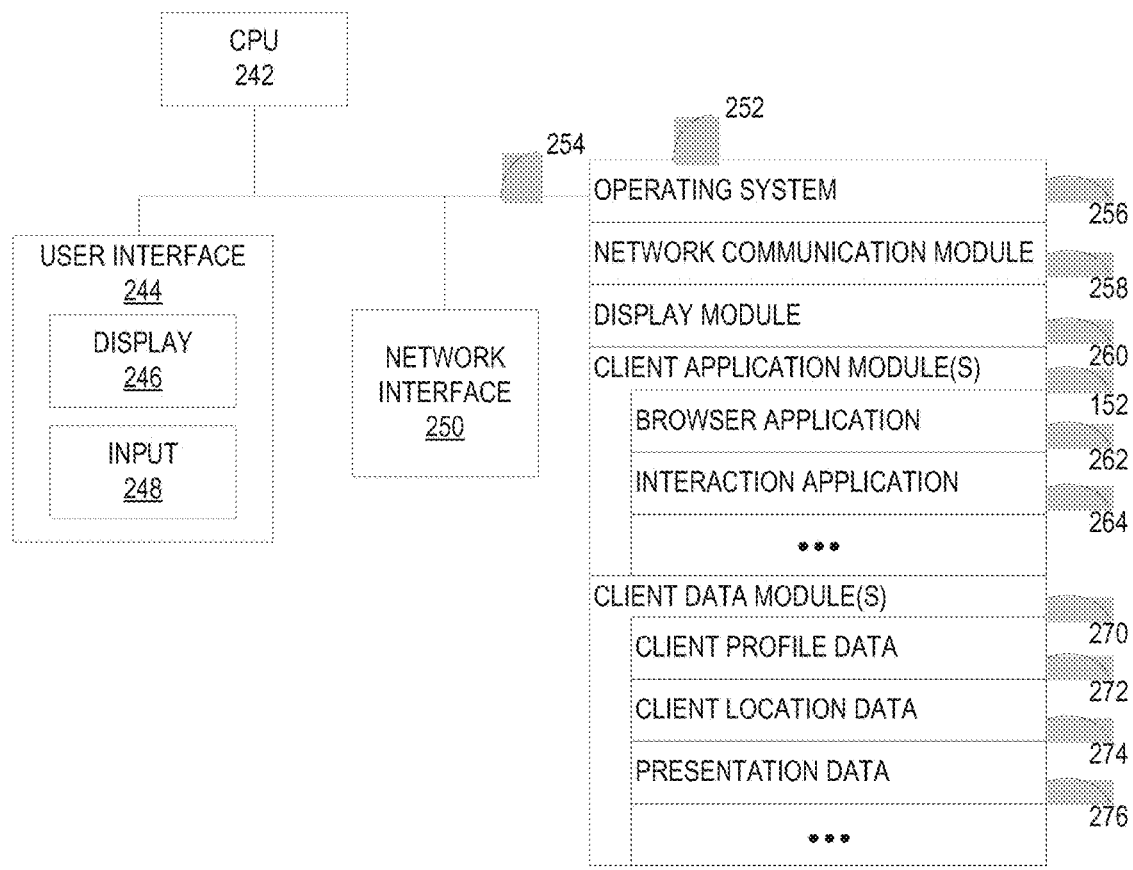
FIG. 2B is a block diagram illustrating a client device in accordance with some embodiments.

FIG. 2B is a block diagram illustrating a client device 150 in accordance with some embodiments. The client device 150 typically includes one or more processing units (CPUs) 242, one or more network interfaces 250, memory 252, and one or more communication buses 254 for interconnecting these components. The client device 150 includes a user interface 244. The user interface 244 includes a display device 246 and optionally includes an input means such as a keyboard, mouse, a touch sensitive display, or other input buttons 248. Furthermore, some client devices 150 use a microphone and voice recognition to supplement or replace the keyboard.

Memory 252 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 252 may optionally include one or more storage devices remotely located from the CPU(s) 242. Memory 252, or alternately the non-volatile memory device(s) within memory 252, comprises a non-transitory computer readable storage medium.

In some embodiments, memory 252, or the computer readable storage medium of memory 252, stores the following programs, modules and data structures, or a subset thereof:

an operating system 256 that includes procedures for handling various basic system services and for performing hardware dependent tasks;

a network communication module 258 that is used for connecting the control device 102 to other computers via the one or more communication network interfaces 250 (wired or wireless) and one or more communication networks, such as the Internet, other wide area networks, local area networks, metropolitan area networks, etc.;

a display module 260 for enabling the information generated by the operating system 256 and client applications 104 to be presented visually on the display device 246;

one or more client applications 152 for handling various aspects of interacting with the server system (e.g., system 120 of FIG. 1), including but not limited to:
 a browser application 262 for sending and receiving data from the server system 120; and
 an interaction application 264 to send interactions (generally social interactions) to the server system 120 for transmission to a presentation device (e.g., device 140 in FIG. 1);

a client data module 270, for storing data relevant to the client device 150, including but not limited to:
 client profile data 272 for storing data regarding the user associated with the client device 150 including but not limited to demographic information about the user, user interest information, user history information, and any other information regarding the user;
 client location data 274 for storing a location associated with the client device 150 (e.g., GPS co-ordinates associated with the client device); and
 presentation data 276 for storing presentation data (e.g., data 130 as seen in FIG. 1) and one or more interactions (e.g., interactions from a control device (e.g., device 102 as seen in FIG. 1) and other client devices (e.g., device 150 as seen in FIG. 1)) received from the server system (e.g., system 120 in FIG. 1).

Figure 3:
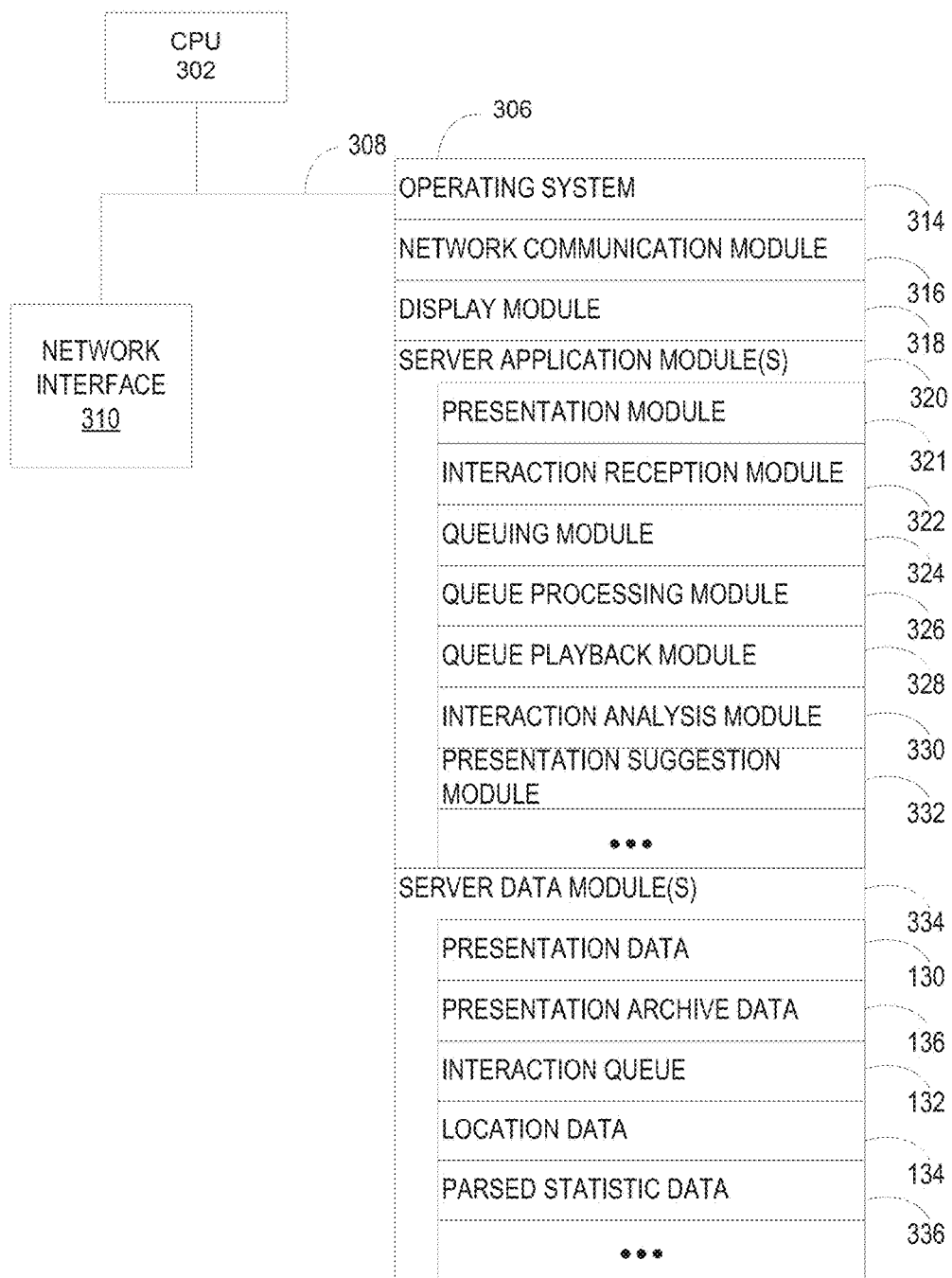
FIG. 3 is a block diagram illustrating a server system in accordance with some embodiments.

FIG. 3 is a block diagram illustrating a server system 120 in accordance with some embodiments. The server system 120 typically includes one or more processing units (CPUs) 302, one or more network interfaces 310, memory 306, and one or more communication buses 308 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302.

Memory 306, or alternately the non-volatile memory device(s) within memory 306, comprises a non-transitory computer readable storage medium. In some embodiments, memory 306, or the computer readable storage medium of memory 306, stores the following programs, modules and data structures, or a subset thereof:

an operating system 314 that includes procedures for handling various basic system services and for performing hardware dependent tasks;

a network communication module 316 that is used for connecting the server system 120 to other computers via the one or more communication network interfaces 310 (wired or wireless) and one or more communication networks, such as the Internet, other wide area networks, local area networks, metropolitan area networks, and so on;

one or more server application modules 320 for performing the services offered by server system 120, including but not limited to:
 a presentation module 321 for transmitting presentation data 130 and interaction data received from one or more control devices (e.g., device 102 in FIG. 1) and one or more client devices (e.g., device 150 in FIG. 1) and then transmitting the presentation data 130 and the interaction data to the appropriate presentation device (e.g., device 140 in FIG. 1);
 an interaction reception module 322 for receiving control and social interactions from one or more control devices (e.g., device 102 in FIG. 1) and one or more client devices (e.g., device 150 in FIG. 1) and storing those interactions in the interaction queue 132;
 a queuing module 324 for adding interactions into the interaction queue 132;
 a queue processing module 326 for determining which interactions in the queue 132 need to be sent to the presentation device 140, the control device 102, and the one or more client devices 150;
 a queue playback module 328 for transmitting the interactions to the appropriate system based on the determinations of the queue processing module 326;
 an interaction analysis module 330 for analyzing past presentation events to determine patterns that can assist in making more effective presentations; and
 a presentation suggestion module 332 for suggesting improvements to future presentations;

server data modules 334, holding data related to server system 120, including but not limited to:
 presentation data 130 including pre-set presentation data for a plurality of presentations (e.g., specific slides for a slideshow);
 presentation archive 136 data including detailed interaction data from previous presentation events, such as voice recordings of a presenter, content change interactions, social interactions, attendee comments, control interactions, and the timing of the various interactions;
 an interaction queue 132 that stores a plurality of interactions received from one or more control devices (e.g., device 102 in FIG. 1) and one or more client devices (e.g., device 150 in FIG. 1), wherein the interactions are stored in the order they are received and are read out in the same order (e.g., first in first out);
 location data 134 including a listing of the location of one or more control devices 102, one or more presentation devices 140, and one or more client device 150; and
 parsed statistic data 336 including statistical data regarding interactions received for particular presentation events (e.g., the amount of time spent on each slide, the comments and questions from attendees, the content changes made by the presenters, etc.).

Figure 4A:
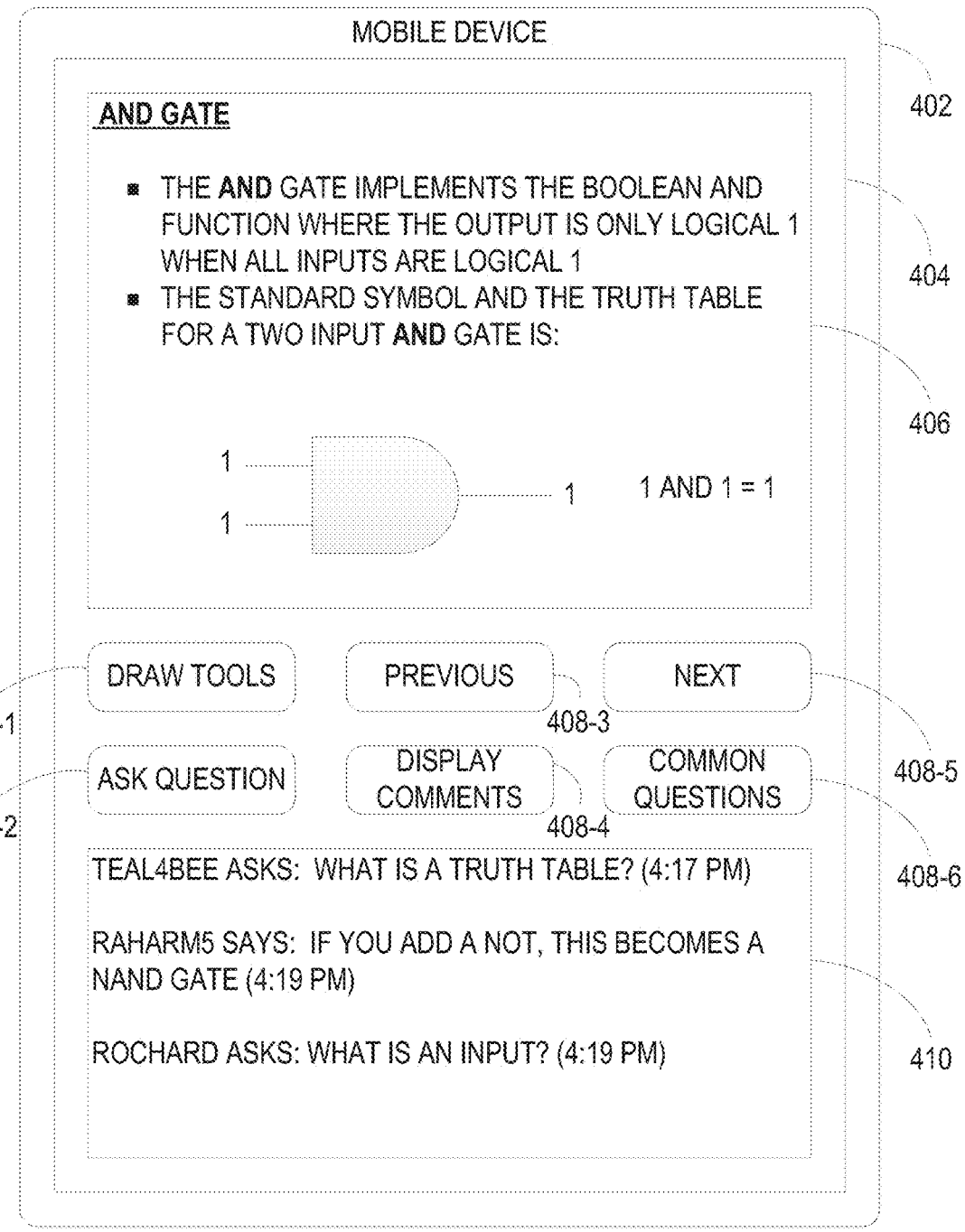
FIG. 4A is a user interface diagram illustrating an example of a user interface of a control device for use in controlling a presentation at a different device, according to some embodiments.

FIG. 4A is a user interface diagram illustrating an example of a user interface 400 of a control device (e.g., device 102 in FIG. 1) for use in controlling a presentation at a different device, according to some embodiments. In the example user interface 400 of FIG. 4, the control device (e.g., device 102 in FIG. 1) is a mobile device 402. The mobile device 402 includes a display screen 404. In some example embodiments the display screen 404 is a touch screen that can use finger swipes and gestures as input.

The display screen 404 includes a presentation display section 406. The presentation display section 406 displays the presentation in its current state (e.g., as it is presented at the presentation device for the audience). In this case the presentation display section 406 shows a slide in a presentation about logic gates.

The display screen 404 also includes one or more control interaction buttons 408-1 to 408-6. In this case the buttons are "Draw Tools" 408-1, "Ask Question" 408-2, "Previous" 408-3, "Display comments" 408-4, "Next" 408-5, and "Common Questions" 408-6. The presenter can select one of the buttons to control what is being displayed with the presentation. For example, the previous button 408-3 and the next button 408-5 send command interactions to the server system 120 that change the slide displayed at the presentation device (e.g., device 140 in FIG. 1).

In other examples, the draw tools button 408-1 allows the presenter to edit the displayed content (e.g., to erase, color, or draw on the various slides). In this way, the presenter is able to directly change the pre-set slides with a variety of customizable tools. The "Ask Question" button 408-2 allows the presenter to submit one or more questions to the attendees of a presentation by sending the questions to the one or more client devices (e.g., device 150 in FIG. 1). The "Common questions" button 408-6 is a control request that prompts the server system (e.g., system 120 in FIG. 1) to send the presenter one or more common questions that attendees ask when viewing the current slide. In this way the presenter can tailor his or her presentation to cover the most useful material.

In some example embodiments the display screen 404 also includes a social interaction display window 410. Thus, one or more social interactions are received from the server system (e.g., system 120 in FIG. 1) (which in turn receives them from one or more client devices (e.g., devices 150 in FIG. 1)). The received social interactions (e.g., questions and comments) are then displayed in the social interaction display window 410 for the presenter to see and review. The presenter can select the "display comments" button 408-4 to cause one or more of the comments/questions to be displayed in the presentation itself.

Figure 4B:
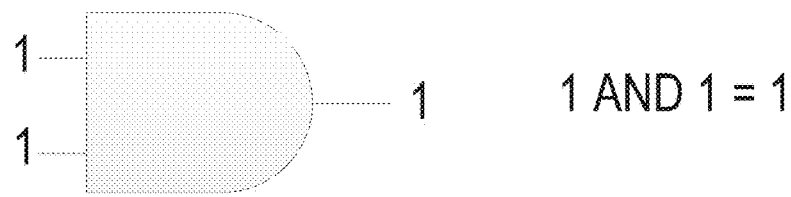
FIG. 4B is a diagram illustrating an example of a display at a presentation device, according to some embodiments.

FIG. 4B is a diagram illustrating an example of a display 450 at a presentation device (e.g., device 140 in FIG. 1), according to some embodiments. In this example, the presentation device has a display 460 (e.g., a screen or a projection area) that displays the presentation to attendees. The displayed presentation is updated based on control interactions received from the control device (e.g., device 102 in FIG. 1) or social interactions from a client device (e.g., device 150 in FIG. 1).

Figure 5A:
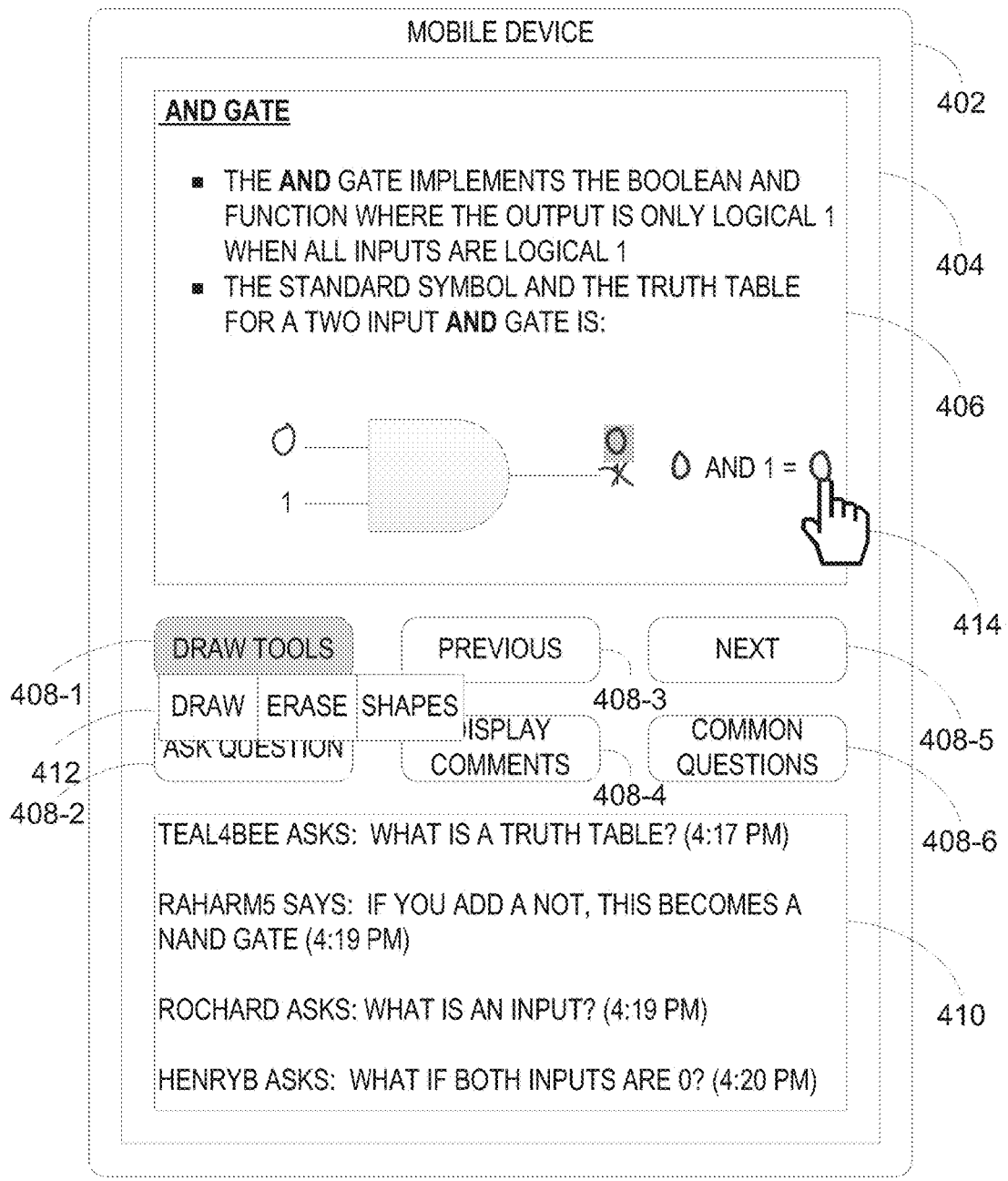
FIG. 5A is a user interface diagram illustrating an example of a user interface of a control device for use in controlling a presentation at a different device, according to some embodiments.

FIG. 5A is a user interface diagram illustrating an example of a user interface 400 of a control device (e.g., device 102 in FIG. 1) for use in controlling a presentation at a different device, according to some embodiments. As seen in FIG. 4A, the control device (e.g., device 102 in FIG. 1) is a mobile device 402. The mobile device 402 includes a display screen 404, a presentation display section 406, one or more control interaction buttons 408-1 to 408-6, and a social interaction display window 410.

In this example, the user (e.g., a presenter) has selected (e.g., through a finger gesture or otherwise) the draw tools button 408-1. In response to user selection of the "draw tools" button 408-1, the user interface 400 is updated to include one or more draw tools 412 (Draw, Erase, and Shapes). The draw tools 412 are displayed superimposed over other user interface 400 components.

In this example, the user (e.g., presenter) has selected the draw tool and has altered the content displayed on the slide to illustrate a different result from the "AND" gate. The user interactions are represented by the user control icon 414 (in this case a hand). Thus, the presenter can update the presented content in the slides in response to questions or comments from viewers/attendees. Questions are added as they come from client devices (e.g., device 150 in FIG. 1) in to the social interaction display window 410. Each question/comment has an associated time and location.

Figure 5B:
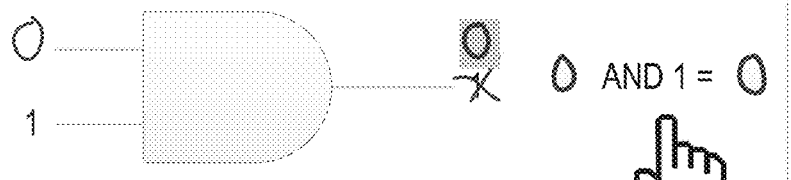
FIG. 5B is a diagram illustrating an example of a display at a presentation device, according to some embodiments.

FIG. 5B is a diagram illustrating an example of a display 460 at a presentation device (e.g., device 140 in FIG. 1), according to some embodiments. In this example, like FIG. 4B, the presentation device has a display 460 (e.g., a screen or a projection area) that displays the presentation to attendees. The displayed presentation has been updated to reflect the changes made at the control device (e.g., device 102 in FIG. 1) associated with the presentation. Specifically, the example number used in FIG. 4B has been erased and a new example has been manually updated based on control interactions received from the control device (e.g., device 102 in FIG. 1) or social interactions from a client device (e.g., device 150 in FIG. 1).

Figure 6A:
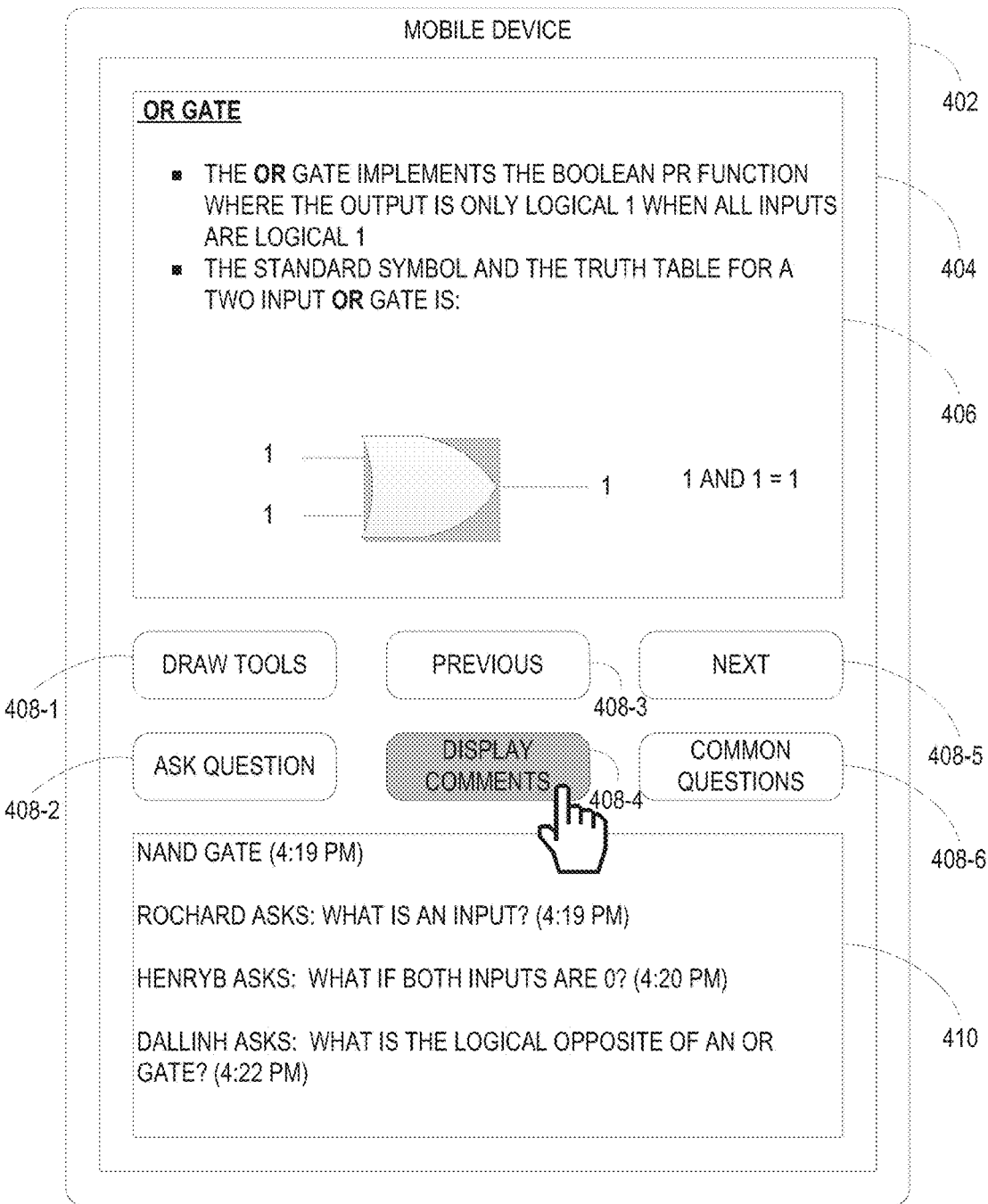
FIG. 6A is a user interface diagram illustrating an example of a user interface of a control device (e.g., device 102 in FIG. 1) for use in controlling a presentation at a different device, according to some embodiments.

FIG. 6A is a user interface diagram illustrating an example of a user interface 400 of a control device (e.g., device 102 in FIG. 1) for use in controlling a presentation at a different device, according to some embodiments. As also seen in FIGS. 4A and 5A, the control device (e.g., device 102 in FIG. 1) is a mobile device 402. The mobile device 402 includes a display screen 404, a presentation display section 406, one or more control interaction buttons 408-1 to 408-6, and a social interaction display window 410.

In this example, the user (e.g., a presenter) has selected (e.g., through a figure gesture or otherwise) the display comments button 408-4. In response to user selection of the "display comments" button 408-4, the control device (e.g., device 102 as seen in FIG. 1) sends an interaction to the server system (e.g., system 120 in FIG. 1). The presentation is updated to display one or more of the received comments and/or questions from the social interaction display window 410. In some example embodiments only the most recent comment or question is displayed. Also of note, the slide being presented has changed in this example, in response to a slide change command interaction (e.g., next or previous) sent by the presenter previously.

FIG. 6B is a diagram illustrating an example of a display 460 at a presentation device (e.g., device 140 in FIG. 1), according to some embodiments. In this example, like FIG. 4B, the presentation device has a display 460 (e.g., a screen or a projection area) that displays the presentation to attendees. The displayed presentation has been updated to reflect the changes made at the control device (e.g., device 102 in FIG. 1) associated with the presentation. Specifically, the example now includes a comment 602 from one of the users currently viewing the presentation.

Figure 7:
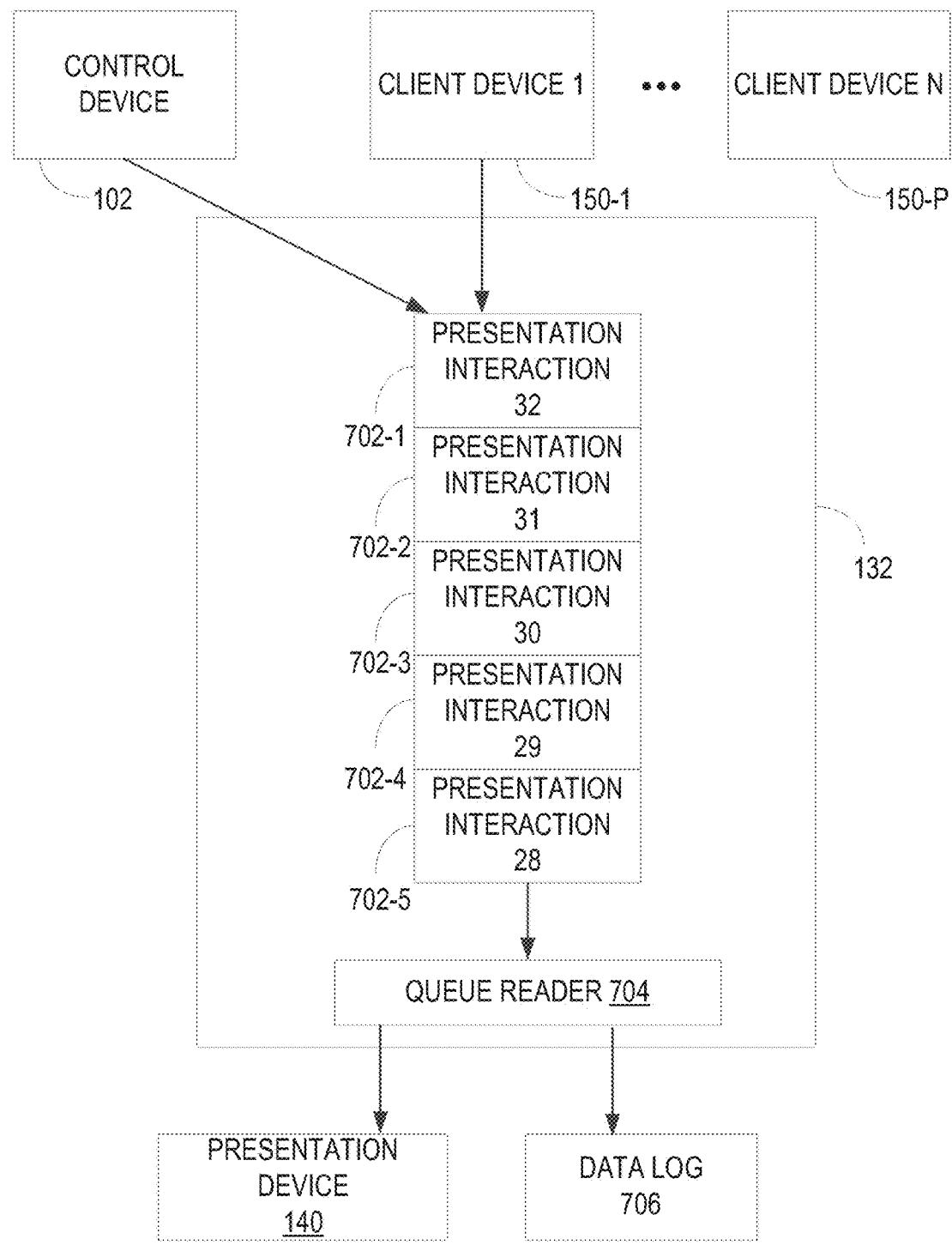
FIG. 7 depicts a block diagram of an exemplary data structure for an interaction queue for storing interactions related to a specific presentation event for use by a server system in some example embodiments.

FIG. 7 depicts a block diagram of an exemplary data structure for an interaction queue for storing interactions related to a specific presentation event for use by a server system (e.g., system 120 in FIG. 1). An interaction queue 132 receives interactions from one or more control devices 102 and one or more client devices 150-1 to 150-P for a particular presentation event. Each presentation event has a dedicated presentation interaction queue that stores and transmits interactions only for the specific presentation.

The received interactions are then stored in an interaction queue 132 that stores one or more presentation interactions in the order they are received. For example, interaction 1 is received and stored in the interaction queue 132, and then interaction 2 is received and stored in the queue 132 after interaction 1.

Each presentation interaction 702-1 to 702-5 includes data related to a specific change that will be made to the currently presented presentation or an associated question or a comment. For example, presentation interaction 28 includes a control interaction that causes the presentation to move from slide number nine to slide number ten. Presentation interaction 29 includes a question from User B stating "Does the current graph include data from 2014?"

A queue reader 704 (a software process or module) pulls interactions off the interaction queue 132 in the order they were placed in the queue 132. Thus, the order of the interactions remains constant. This is typically called First In First Out order (FIFO).

The queue reader 704 then determines where the interaction that has just been pulled off the interaction queue 132 needs to be sent. In general, each interaction is sent to one or more presentation devices 140 where the interaction is replayed to replicate the same presentation experience on the various presentation devices 140 as on the control device 102. In some example embodiments the interactions is also sent to either the control device 102 (if it originated from a client device 150) or to a client device 150 if it originated in the control device 102.

In some example embodiments all presentation interactions are also stored in a data log 706 for the specific presentation event. By storing all the interactions, the data log will include a complete (or near complete) record of what happened during a particular presentation event, such that it can be recreated at any later time for analysis.

Figure 8A:
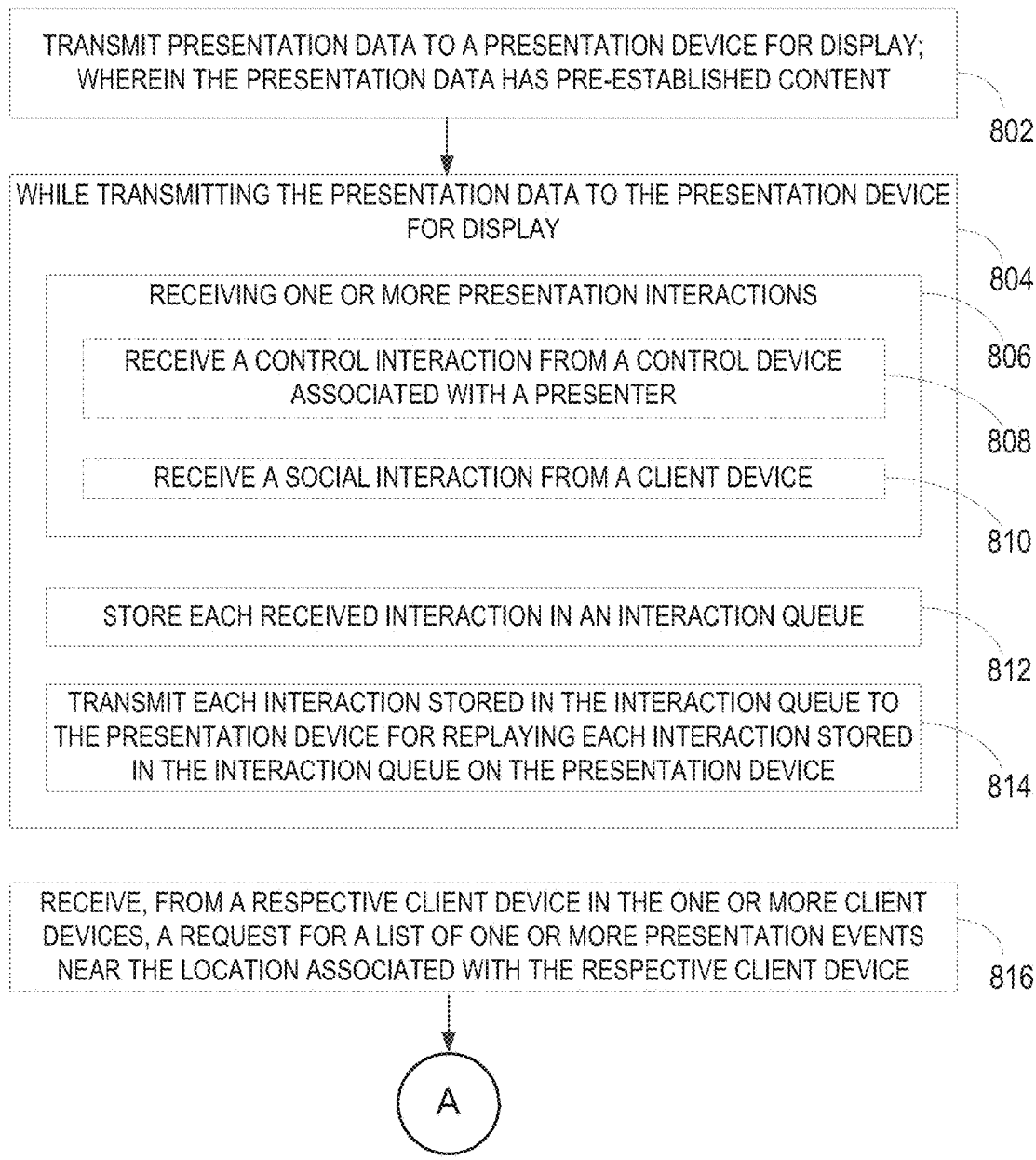
FIG. 8A is a flow diagram illustrating a process for remote control and modification of live presentations in accordance with some embodiments.

FIG. 8A is a flow diagram illustrating a process for remote control and modification of live presentations in accordance with some embodiments. Each of the operations shown in FIG. 8A may correspond with instructions stored in a computer memory or computer readable storage medium. Optional operations are indicated by dashed lines (e.g., boxes with dashed-line borders). In some embodiments, the method described in FIG. 8A is performed by the server system (e.g., system 120 in FIG. 1).

In some embodiments the method is performed at a server system including one or more processors and memory storing one or more computer programs for execution by the one or more processors.

The server system receives notification from a control device (e.g., device 102 in FIG. 1) that the user associated with the control device has scheduled a live presentation event. The live presentation event is associated with a specific pre-established presentation (e.g., a standard slideshow that is used for multiple presentation events).

When the presentation is scheduled to begin, the server system transmits (802) presentation data to a presentation device (e.g., presentation device 140) for display; wherein the presentation data has pre-established content. For example, the server system stores the slides for Presentation J. Then, when a presentation event is scheduled, the server system sends the slide data to the presentation device. The presentation device then causes the presentation data to be presented.

In some example embodiments, while transmitting (804) the presentation data to the presentation device for display, the server system receives (806) one or more presentation interactions. Presentation interactions are messages or data received from control devices or client devices (e.g., device 150 in FIG. 1) that connect to the server system.

Presentation interactions include control interactions that are received (808) from the control device. Control interactions are interactions that control the presentation itself by determining what is currently presented (e.g., what slide is currently shown), changing or altering content (e.g., the presenter erases a specific example and draws another in its place), displaying audience participation prompts (e.g., an audience quiz), and other interactions that directly control the presented information. For example, a presenter uses a control device to control the displayed presentation by changing slides and drawings as appropriate to illustrate a point or answer a question. In other embodiments control interactions are interactions that result in displaying any kind of presentation meta-information that is not a part of the original presentation slides. One example is when a presenter sends a control interaction to display an automatically generated QR code and/or direct URL that encodes the event's (or presentation's) URL.

The control interactions received from the first control device include control interactions that change the content presented at the presentation event. For example, a control interaction causes the presentation device to change the display to a different slide or video clip.

In some example embodiments, the control interactions received from the first control device include control interactions that alter the preselected content in the slideshow presentation. For example, the control interaction represents the presenter drawing on the presentation screen to add additional information or to answer questions.

In some example embodiments, receiving presentation interactions includes receiving (810) one or more social interactions from one or more client devices. Examples of social interactions include, but are not limited to: a question, a comment, an answer to a survey or quiz, or a message. Each of these interactions are stored in interaction queue 132 by the server system and then transmitted to the presentation device in order. In some example embodiments there are separate queues for control interactions and social interactions.

The server system stores (812) each interaction in an interaction queue (e.g., interaction queue 132 of FIG. 1). The interaction queue stores each interaction in the order that it is received. Then the interactions are read out based on the order they were stored (e.g., a FIFO system).

In some example embodiments the server system transmits (814) each interaction stored in the interaction queue to the presentation device for replaying each interaction on the presentation device. For example, the interactions are replayed at the presentation device such that the presentation displayed at the presentation device mirrors the presentation at the control device.

In some example embodiments the control device is distinct from the presentation device. In some example embodiments the control device has an associated first location, the presentation device has an associated second location, and the client device has an associated third location. In some example embodiments the one or more client devices all have different locations (e.g., they are all viewing the presentation remotely). In other embodiments, the one or more client devices all have the same or nearby locations (e.g., all the viewers are attending the presentation at the same location).

In some example embodiments the server system receives (816) a request for a list of one or more presentation events near the location associated with the respective client device. For example, a user at a university campus requests a list of any presentations on the campus. The server system determines whether a presentation is near when it is within a specific distance. In some example embodiments the requesting user selects a distance. In other examples, the distance is predetermined by the server system.

Figure 8B:
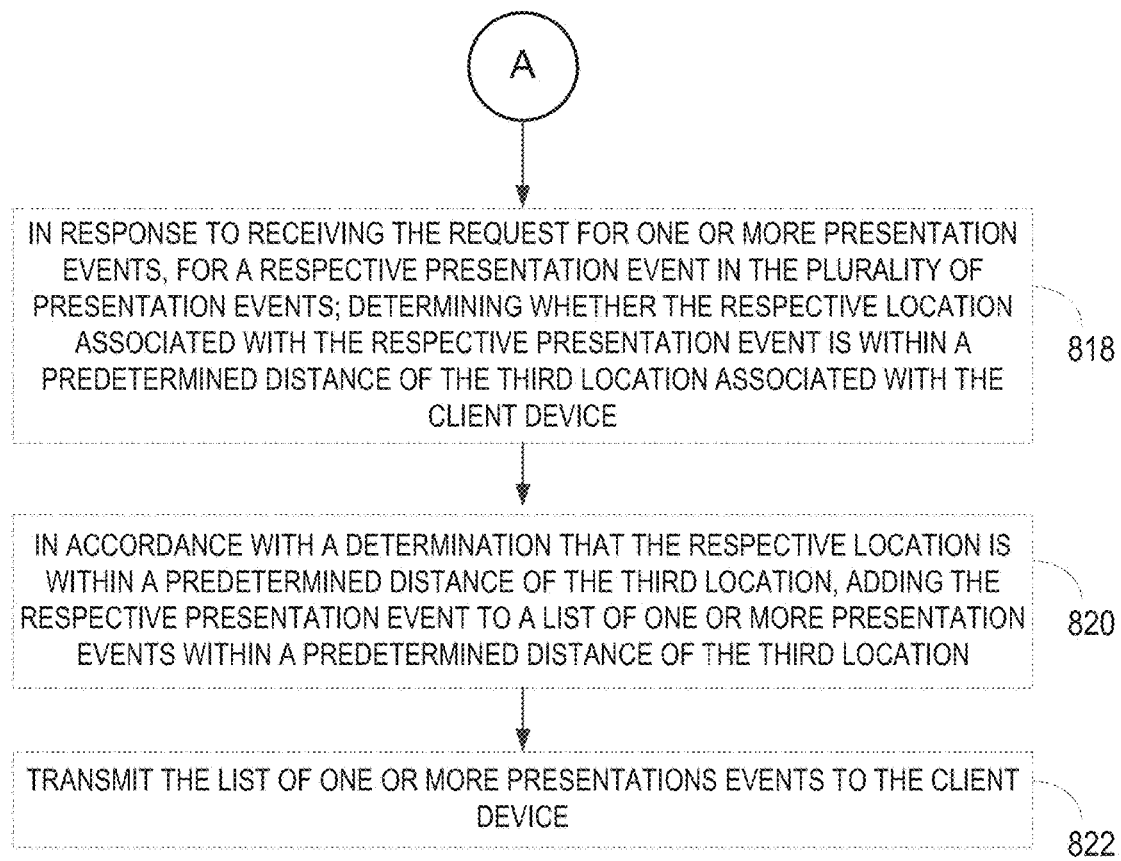
FIG. 8B is a flow diagram illustrating a process for remote control and modification of live presentations in accordance with some embodiments.

FIG. 8B is a flow diagram illustrating a process for remote control and modification of live presentations in accordance with some embodiments. Each of the operations shown in FIG. 8B may correspond with instructions stored in a computer memory or computer readable storage medium. Optional operations are indicated by dashed lines (e.g., boxes with dashed-line borders). In some embodiments, the method described in FIG. 8B is performed by the server system 120 illustrated in FIG. 1.

In some embodiments the method is performed at a server system (e.g., system 120 in FIG. 1) including one or more processors and memory storing one or more programs for execution by the one or more processors.

In some example embodiments, in response to receiving the request for one or more presentation events, the server system for a respective presentation event in the plurality of presentation events determines (818) whether the respective location associated with the respective presentation event is within a predetermined distance of the third location associated with the client device (e.g., client device 150). For example, if the client device is located in a high school, the server system determines whether the respective presentation event has a location that is also located within the high school.

In some example embodiments, in accordance with a determination that the respective location is within a predetermined distance of the third location, the server system adds (820) the respective presentation event to a list of one or more presentation events within a predetermined distance of the third location.

In some example embodiments, the server system transmits (822) the list of one or more presentations events to the client device. For example, the server system sends a list of four currently running presentations to the requesting client system.

FIG. 9 depicts a block diagram of an exemplary data structure for a pre-established presentation database for storing pre-established presentation records in accordance with some embodiments. In accordance with some embodiments, the presentation database data structure includes a plurality of pre-established presentation records 902-1 to 902-P, each of which corresponds to a pre-established presentation (e.g., the data, figures, videos, and other presentation materials that are used as visual cues for each pre-sentation event but not the specific presentation information for each particular presentation event).

In some embodiments, as illustrated in FIG. 9, a respective pre-established presentation record 902-1 stores a unique presentation ID 904 to identify the pre-established presentation 902-1, a presentation name 906, topic data 908 for identifying the topic of the presentation, pre-established presentation data 910 (e.g., the data that actually makes up the presentation includes slides, text, images, and video), trend data 912, and one or more presentation events 914-1 to 914-0.

In some embodiments, the trend data 912 is data generated by analyzing the one or more presentation events 914-1 to 914-0. The trend data 912 notes, among other things, when a certain comment or question is repeated on the same slide or a section of the presentation uses a disproportionate amount of time. This information can then be used to improve the pre-established presentation 902-1 or customize it for a particular audience.

In some example embodiments each presentation event 914-1 to 914-0 includes a presentation event ID 916, an interaction queue 918, a presentation location 920, an attendee list 922, a presentation time 924, demographic information 926 for attendees, a presenter ID 928, and audio data 930.

In some example embodiments the presentation event ID 916 is a unique ID number that identifies a specific presentation event. The interaction queue 918 stores all the interactions received during the particular live presentation event. The interaction queue 918 is ordered chronologically such that all the presentation events can be replayed to recreate the presentation exactly as it happened.

The presentation location 920 stores the physical location of the presentation device (e.g., device 140 in FIG. 1). In some example embodiments there are multiple presentation devices and the presentation location 920 stores each location.

In some example embodiments the attendee list 922 includes a list of users who are registered as attending the presentation. In some example embodiments the server system uses a local network to identify client devices in the same area as the presentation and then determine the associated users. The demographic information 926 identifies the demographic information associated with the attendee list 922.

In some example embodiments the presentation time 924 identifies the time of the live presentation that generated the presentation event 914. The record of the presentation event 914 also includes a presenter ID 928 that identifies a unique user of the server system (e.g., system 120 in FIG. 1). The record of the presentation event 914 further includes audio data 930, which is a recording of all audio words spoken during the presentation.

FIG. 10 depicts a flow diagram of an exemplary data structure for a pre-established presentation database for storing pre-established presentation records in accordance with some embodiments.

In some embodiments, the server system (e.g., system 120 in FIG. 1) has stored presentation data (e.g., pre-established slideshow) for a plurality of pre-established presentations. When a live presentation event (e.g., a specific instance of a slideshow presentation) is scheduled, the server system transmits the presentation data 1002 to the presentation event database 1008, which stores specific presentation events.

The server system receives one or more interactions 1004 from a control device (e.g., device 102 in FIG. 1) and one or more client devices (e.g., device 150 in FIG. 1). Each interaction 1004 is stored in the interaction queue 1006. The interaction queue 1006 stores interactions 1004 in the order that they are received. In some example embodiments all the interactions 1004 are also stored in an interaction log. The interaction log can be used to totally recreate the specific presentation event as it occurred.

In some example embodiments the interaction queue 1006 (or the interaction log) is stored in the presentation event database 1008. The presentation event database 1008 stores a plurality of presentation events, each associated with a specific pre-established presentation.

When a new presentation is scheduled, the server system sends new presentation event information 1014 to a compilation and analysis module 1012. The compilation and analysis module 1012 also receives presentation event data related to the specific pre-established presentation from the presentation event database 1008 and attendee demographic data 1010.

In response, the compilation and analysis module 1012 first sorts the presentation events by the pre-established presentation that they are associated with. In this way the compilation and analysis module 1012 can parse all the presentation events associated with a given pre-established presentation to determine trend data associated with the pre-established presentation. For example, if presentation A has 50 presentation events, the compilation and analysis module 1012 collects all 50 events together. Then, the compilation and analysis module 1012 determines whether any patterns occur in the presentation data 1002 of the presentation events. Thus, if the same questions appear repeatedly in specific parts of the presentation, the compilation and analysis module 1012 records that in the trend data.

The server system then uses the information about the new presentation event information 1014 and the compilation and analysis module 1012 to generate presentation content recommendations 1016. Continuing the above example, presentation A has 50 events and the compilation and analysis module 1012 determines that the question "What is the best response to the Berlin Defense?" is asked in 85% of the presentation events for presentation A on slide 6. The generated presentation content recommendation 1016 includes a recommendation that the presenter update slide 6 to respond to this commonly asked question.

Figure 11A:
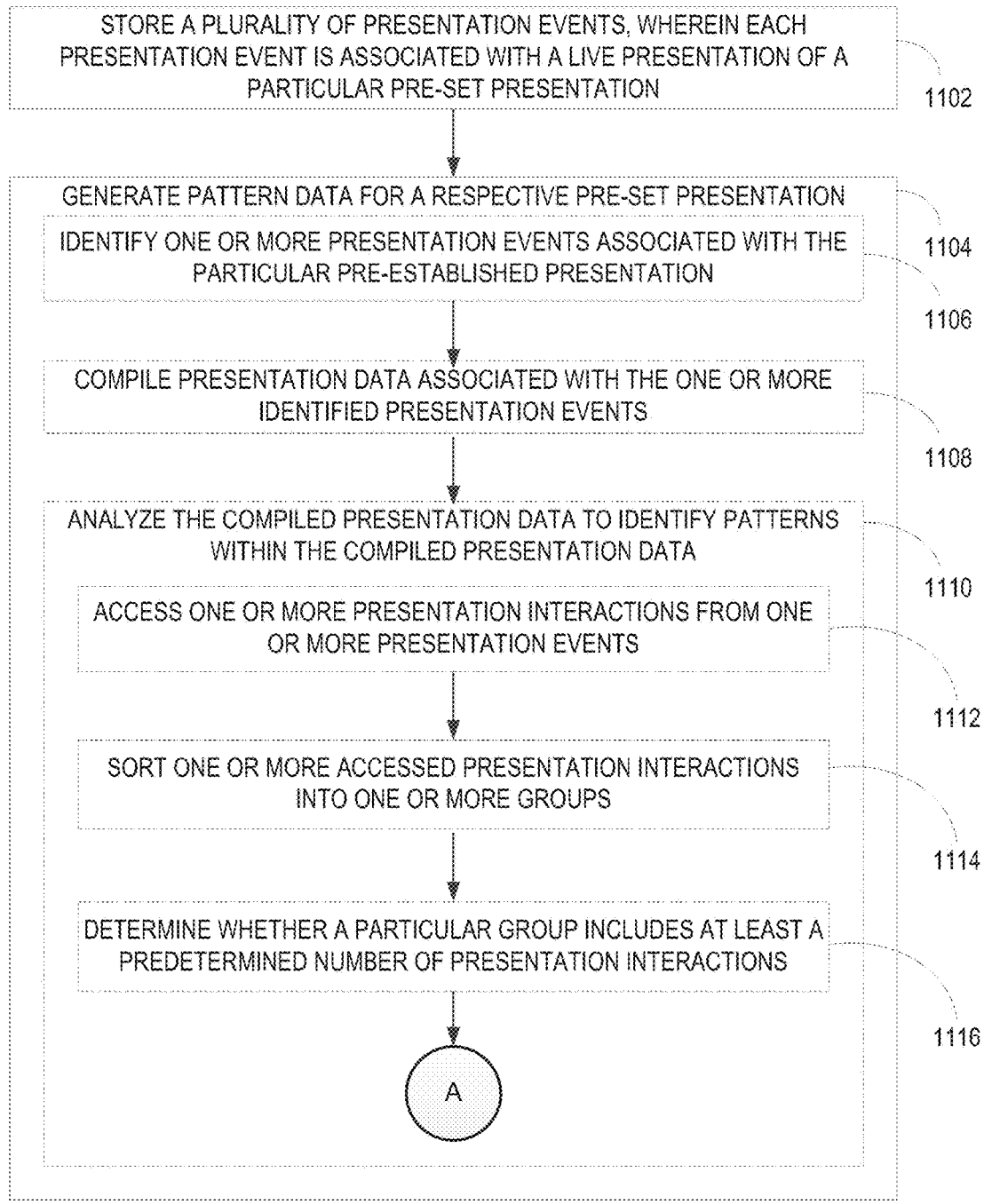
FIG. 11A is a flow diagram illustrating a process for storing and analyzing presentation data in accordance with some embodiments.

FIG. 11A is a flow diagram illustrating a process for storing and analyzing presentation data in accordance with some embodiments. Each of the operations shown in FIG. 11A may correspond to instructions stored in a computer memory or computer readable storage medium. Optional operations are indicated by dashed lines (e.g., boxes with dashed-line borders). In some embodiments, the method described in FIG. 11A is performed by the server system (e.g., system 120 in FIG. 1).

In some embodiments the method is performed at a computer system including one or more processors and memory storing one or more programs for execution by the one or more processors.

In some example embodiments the server system stores (1102) a plurality of presentation events, wherein each presentation event is associated with a live presentation of a particular pre-set presentation. Each live presentation is recorded by server system as it is presented.

Recording a presentation is accomplished by the server system collecting and storing three main pieces of data. The server system starts with the pre-established presentation data (e.g., a presentation with slides), the interaction data received as the presentation is being given (e.g., this includes interactions that control the presentations and social interactions such as comments and questions), and audio data received from the presenter (and potentially the audience) during the presentation. In some example embodiments the pre-established presentation data is received from the presenter prior to beginning the live presentation.

The server system generates (1104) pattern data for a respective pre-set presentation. In some example embodiments generating pattern data includes determining a specific pre-set presentation. In some example embodiments the specific pre-established presentation is determined based on a pre-established presentation that is scheduled (e.g., a user schedules a presentation and transmits the presentation data to the server system).

The server system then identifies (1106) one or more presentation events associated with the particular pre-established presentation. Presentation events that are associated with a particular pre-established presentation represent previous live presentations of the presentation that are recorded and stored on the server system for later analysis. For example, if a slideshow is presented multiple times, each specific presentation will be stored. These stored presentations (called presentation events) can be analyzed to improve further presentations of that slideshow.

The server system compiles (1108) presentation data associated with the one or more identified presentation events. For example, the server system stores 250 presentation events and needs to sort them by the actual presentation that they are associated with (e.g., when the server system stores multiple different pre-established presentations).

The server system analyzes (1110) the compiled presentation data to identify patterns within the compiled presentation data. In some example embodiments analyzing the compiled presentation data includes accessing (1112) one or more presentation interactions from one or more presentation events. For example, the server system accesses all the stored presentation events that are associated with a specific pre-established presentation. Then, each presentation event is parsed to extract specific interactions from the event.

In some example embodiments presentation events include questions or comments from presentation event attendees. In other embodiments, presentation events include control commands from the presenter of the presentation.

Once the presentation interactions have been accessed, the server system sorts (1114) one or more extracted presentation interactions into one or more groups. In some example embodiments presentation events are sorted into one or more groups are based on the content of the presentation events. For example, each comment or question is parsed to identify keywords and topics. Once keywords and/or topics have been identified, the server system groups (or sorts) each interaction into a group based on the keywords. Thus, if a question is "What is the best response to the Berlin Defense?" the server system will determine a topic of "Berlin Defense Response" and group it with other questions that have the same topic.

In some example embodiments each interaction is associated with a specific section of the presentation (e.g., with a specific slide). For example, when a comment is received, the server system notes that slide 20 is currently displayed and associates the received comment with slide 20. Interactions can then be grouped by the portion of the presentation they are associated with, in addition to their topic.

Once all the interactions have been grouped, the server system analyzes each group. For each group the server system determines (1116) whether the group includes at least a certain number of presentation interactions. The certain number can be predetermined by the server system or customized by users. In some example embodiments the predetermined number is a percentage, such that the number is based on the total number of interactions.

Figure 11B:
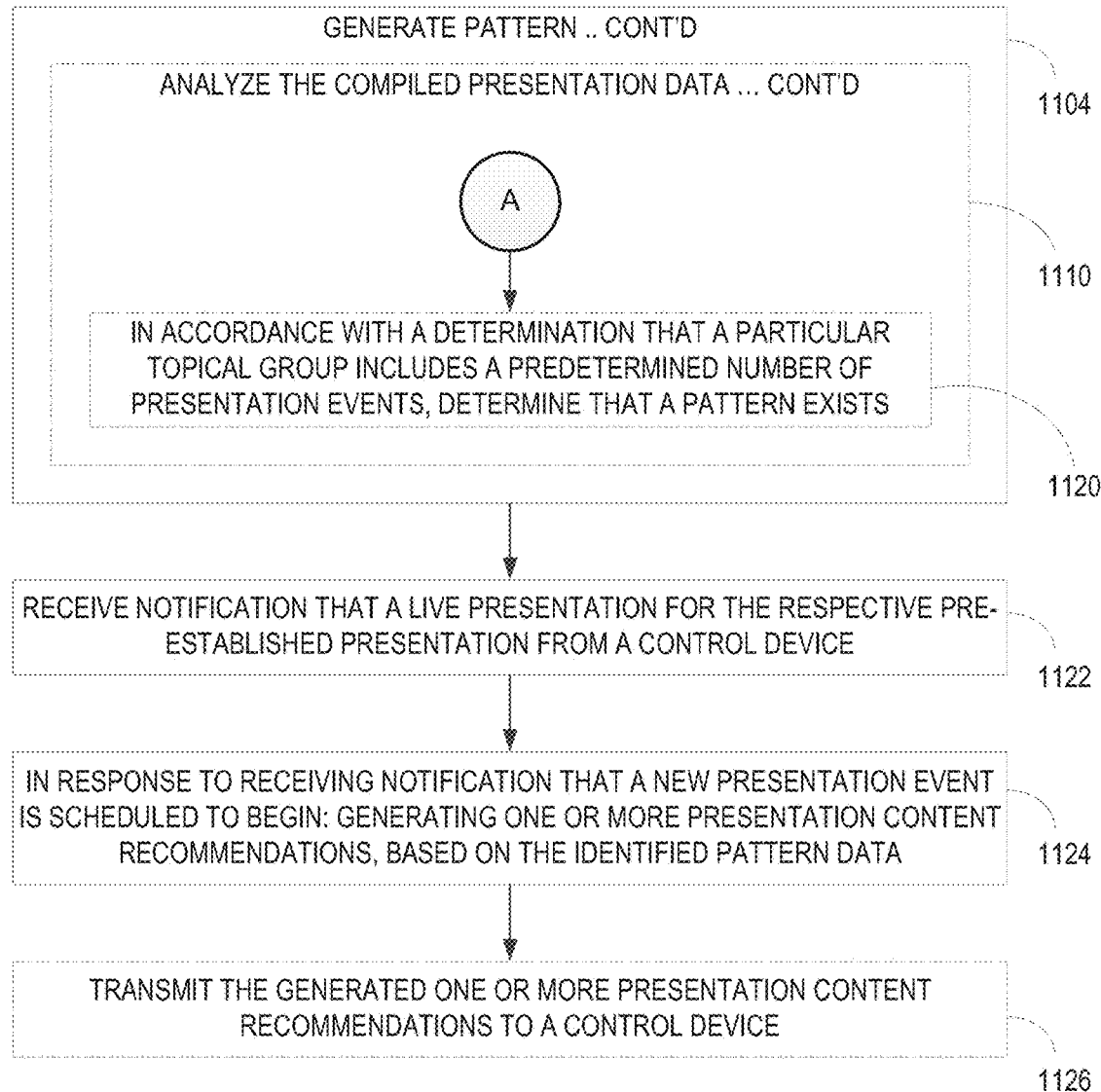
FIG. 11B is a flow diagram illustrating a process for storing and analyzing presentation data in accordance with some embodiments.

FIG. 11B is a flow diagram illustrating a process for storing and analyzing presentation data in accordance with some embodiments. Each of the operations shown in FIG. 11B may correspond to instructions stored in a computer memory or computer readable storage medium. Optional operations are indicated by dashed lines (e.g., boxes with dashed-line borders). In some embodiments, the method described in FIG. 11B is performed by the server system (e.g., device 120 in FIG. 1).

In some embodiments the method is performed at a computer system including one or more processors and memory storing one or more programs for execution by the one or more processors.

In accordance with a determination that a particular topical group includes a number of presentation events, the server system determines (1120) that a pattern exists. For example, if there are 20 interactions (out of 200 total interactions) that are grouped into the "Berlin Defense Response" group for slide 12, the server system will determine that a trend of asking about the Berlin defense on slide 12 has been established. The server system can then use this trend data to suggest altering slide 12 to cover this frequently asked topic.

The server system then receives (1122) notification of a live presentation for the respective pre-established presentation from a control device. For example, presenter A sends the server system a notification that he or she intends to present slideshow A at noon the next day.

In response to receiving notification that a new presentation event is scheduled to begin, the server system generates (1124) one or more presentation content recommendations, based on the identified pattern data. For example, the server system determines that there is trend data indicating that slide 12 commonly results in a question about the "Berlin Defense." As a result, the server system sends a recommendation that the presentation be updated to include an answer to this commonly asked question.

The server system then transmits (1126) the generated one or more presentation content recommendations to a control device for display.

Figure 12:
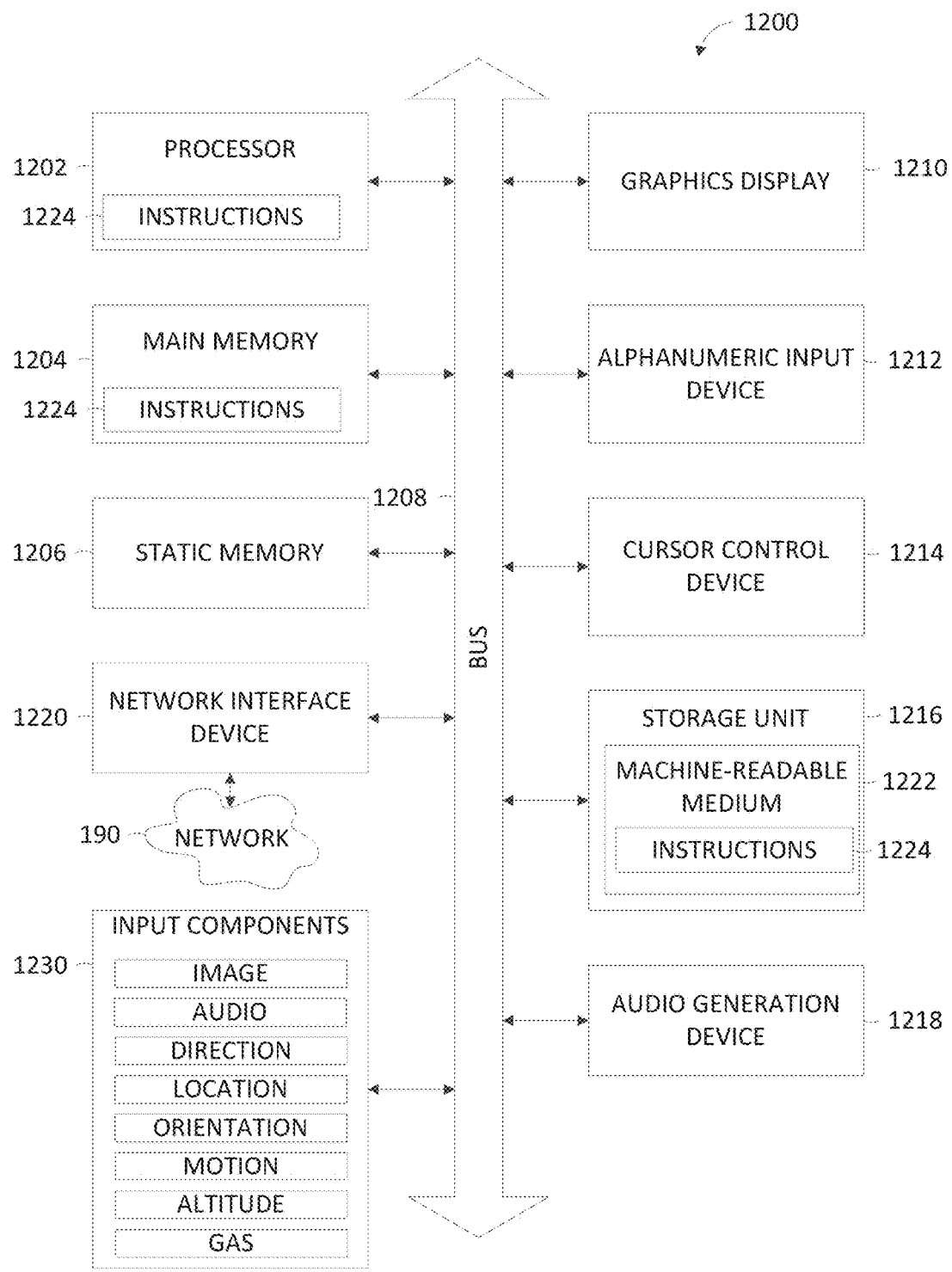
FIG. 12 is a block diagram illustrating components of a machine, according to some example embodiments.

FIG. 12 is a block diagram illustrating components of a machine 1200, according to some example embodiments, able to read instructions 1224 from a machine-readable medium 1222 (e.g., a non-transitory machine-readable medium, a machine-readable storage medium, a computer-readable storage medium, or any suitable combination thereof) and perform any one or more of the methodologies discussed herein, in whole or in part. Specifically, FIG. 12 shows the machine 1200 in the example form of a computer system (e.g., a computer) within which the instructions 1224 (e.g., software, a program, an application, an applet, an app, or other executable code) for causing the machine 1200 to perform any one or more of the methodologies discussed herein may be executed, in whole or in part.

In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include any collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The processor 1202 may contain microcircuits that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein.

The machine 1200 may further include a graphics display 1210 (e.g., a plasma display panel (PDP), a light emitting diode (LED) display, a liquid crystal display (LCD), a projector, a cathode ray tube (CRT), or any other display capable of displaying graphics or video). The machine 1200 may also include an alphanumeric input device 1212 (e.g., a keyboard or keypad), a cursor control device 1214 (e.g., a mouse, a touchpad, a trackball, a joystick, a motion sensor, an eye tracking device, or other pointing instrument), a storage unit 1216, an audio generation device 1218 (e.g., a sound card, an amplifier, a speaker, a headphone jack, or any suitable combination thereof), and a network interface device 1220.

The storage unit 1216 includes the machine-readable medium 1222 (e.g., a tangible and non-transitory machine-readable storage medium) on which are stored the instructions 1224 embodying any one or more of the methodologies or functions described herein. The instructions 1224 may also reside, completely or at least partially, within the main memory 1204, within the processor 1202 (e.g., within the processor's cache memory), or both, before or during execution thereof by the machine 1200. Accordingly, the main memory 1204 and the processor 1202 may be considered machine-readable media (e.g., tangible and non-transitory machine-readable media). The instructions 1224 may be transmitted or received over a network 190 via the network interface device 1220. For example, the network interface device 1220 may communicate the instructions 1224 using any one or more transfer protocols (e.g., hypertext transfer protocol (HTTP)).

In some example embodiments, the machine 1200 may be a portable computing device, such as a smart phone or tablet computer, and have one or more additional input components 1230 (e.g., sensors or gauges). Examples of such input components 1230 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1224 for execution by the machine 1200, such that the instructions 1224, when executed by one or more processors of the machine 1200 (e.g., the processor 1202), cause the machine 1200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   causing, by a server system with one or more computer processors, presentation data of a video presentation to be presented by a presentation device, a first client device, and a second client device, the presentation device being located at a presentation location, the first client device being located at a first remote location, and the second client device being located at a second remote location, the first client device and the second client device participating in the video presentation, wherein the presentation data has pre-established content;
   while causing presentation of the presentation data, receiving a plurality of presentation interactions, including at least one control interaction from a control device, a first presentation interaction from the first client device, and a second presentation interaction from the second client device, the at least one control interaction modifying an aspect of presenting the pre-established content, and the first and second presentation interactions including content provided by respective users of the first client device and the second client device;
   determining, based on the first remote location for the first client device, that a distance between the first client device and the presentation location associated with the presentation device is less than a threshold distance, yielding, a first determination;
   determining, based on the second remote location for the second client device, that a distance between the second client device and the presentation location associated with the presentation device meets or exceeds the threshold distance, yielding a second determination;
   storing each of the plurality of presentation interactions in an interaction queue;
   for each presentation interaction stored in the interaction queue, adjusting presentation of the video presentation based of the respective presentation interaction based on the order the presentation interactions were stored in the interaction queue, wherein adjusting presentation of the video presentation comprises:
      causing the content associated with the first presentation interaction to be presented on at least the presentation device and the first client device based on the first determination that the distance between the first client device and the presentation location associated with the presentation device is less than the threshold distance; and
      causing the content associated with the second presentation interaction to be presented on at least the control device and not on the presentation device based on the second determination that the distance between the second client device and the presentation location associated with the presentation device meets or exceeds the threshold distance.

2. The method of claim 1, wherein the control device is distinct from the presentation device.

3. The method of claim 1, wherein the control device associated with a presenter.

4. The method of claim 3, wherein the control interactions received from the control device include control interactions that change the content currently presented at the presentation event.

5. The method of claim 3, wherein the control interactions received from the first control device alters preselected content in a slideshow presentation.

6. The method of claim 1, wherein the plurality of presentation interactions include one or more social interactions from one or more client devices.

7. The method of claim 1, wherein the control device has an associated first location, the presentation device has an associated second location, and a respective client device in the one or more client devices has an associated third location.

8. The method of claim 7, further including:
   receiving, from the respective client device in the one or more client devices, a request for a list of one or more presentation events near the location associated with the respective client device.

9. The method of claim 8, wherein the server system administers a plurality of distinct presentation events simultaneously, each with an associated location; and the method further comprising:

in response to receiving the request for the list of one or more presentation events:

for a respective presentation event in a plurality of distinct presentation events, determining whether a respective location associated with a respective presentation event is within a predetermined distance of the third location associated with the client device; and in accordance with a determination that the respective location is within a predetermined distance of the third location, adding the respective presentation event to the list of one or more presentation events within the predetermined distance of the third location; and transmitting the list of one or more presentations events to the client device.

10. The method of claim 9, wherein a location associated with a presentation event is a geographic location at which the presentation event is being presented.

11. A server system comprising:

one or more computer processors; and one or more computer-readable mediums storing instructions that, when executed by the one or more computer processors, cause the server system to perform operations comprising:

causing presentation data of a video presentation to be presented by a presentation device, a first client device, and a second client device, the presentation device being located at a presentation location, the first client device being located at a first remote location, and the second client device being located at a second remote location, the first client device and the second client device participating in the video presentation, wherein the presentation data has pre-established content;

while causing presentation of the presentation data, receiving a plurality of presentation interactions, including at least one control interaction from a control device, a first presentation interaction from the first client device, and a second presentation interaction from the second client device, the at least one control interaction modifying an aspect of presenting the pre-established content, and the first and second presentation interactions including content provided by respective users of the first client device and the second client device;

determining, based on the first remote location for the first client device, that a distance between the first client device and the presentation location associated with the presentation device is less than a threshold distance, yielding a first determination;

determining, based on the second remote location for the second client device, that a distance between the second client device and the presentation location associated with the presentation device meets or exceeds the threshold distance, yielding a second determination;

storing each of the plurality of presentation interactions in an interaction queue;

for each presentation interaction stored in the interaction queue, adjusting presentation of the video presentation based of the respective presentation interaction based on the order the presentation interactions were stored in the interaction queue, wherein adjusting presentation of the video presentation comprises:

causing the content associated with the first presentation interaction to be presented on at least the presentation device and the first client device based on the first determination that the distance between the first client device and the presentation location associated with the presentation device is less than the threshold distance; and causing the content associated with the second presentation interaction to be presented on at least the control device and not on the presentation device based on the second determination that the distance between the second client device and the presentation location associated with the presentation device meets or exceeds the threshold distance.

12. The server system of claim 11, wherein the control device is distinct from the presentation device.

13. The server system of claim 11, wherein the control device is associated with a presenter.

14. The server system of claim 11, wherein the plurality of presentation interactions include one or more social interactions from one or more client devices.

15. The server system of claim 11, wherein the control device has an associated first location, the presentation device has an associated second location, and a respective client device in the one or more client devices has an associated third location.

16. A non-transitory computer-readable medium storing instructions that, when executed by one or more computer processors of a server system, cause the server system to perform operations comprising:

causing presentation data of a video presentation to be presented by a presentation device, a first client device, and a second client device, the presentation device being located at a presentation location, the first client device being located at a first remote location, and the second client device being located at a second remote location, the first client device and the second client device participating in the video presentation, wherein the presentation data has pre-established content;

while causing presentation of the presentation data, receiving a plurality of presentation interactions, including at least one control interaction from a control device, a first presentation interaction from the first client device, and a second presentation interaction from the second client device, the at least one control interaction modifying an aspect of presenting the pre-established content, and the first and second presentation interactions including content provided by respective users of the first client device and the second client device;

determining, based on the first remote location for the first client device, that a distance between the first client device and the presentation location associated with the presentation device is less than a threshold distance, yielding a first determination;

determining, based on the second remote location for the second client device, that a distance between the second client device and the presentation location associated with the presentation device meets or exceeds the threshold distance, yielding a second determination;

storing each of the plurality of presentation interactions in an interaction queue;

for each presentation interaction stored in the interaction queue, adjusting presentation of the video presentation based of the respective presentation interaction based on the order the presentation interactions were stored in the interaction queue, wherein adjusting presentation of the video presentation comprises:
causing the content associated with the first presentation interaction to be presented on at least the presentation device and the first client device based on the first determination that the distance between the first client device and the presentation location associated with the presentation device is less than the threshold distance; and
causing the content associated with the second presentation interaction to be presented on at least the control device and not on the presentation device based on the second determination that the distance between the second client device and the presentation location associated with the presentation device meets or exceeds the threshold distance.

17. The non-transitory computer-readable medium of claim 16, wherein the control device is distinct from the presentation device.

18. The non-transitory computer-readable medium of claim 16, wherein the control device is associated with a presenter.

19. The non-transitory computer-readable medium of claim 16, wherein the plurality of presentation interactions include one or more social interactions from one or more client devices.

20. The non-transitory computer-readable medium of claim 16, wherein the control device has an associated first location, the presentation device has an associated second location, and a respective client device in the one or more client devices has an associated third location.

* * * * *

UNITED STATES PATENT AND TRADEMARK OFFICE
CERTIFICATE OF CORRECTION

PATENT NO. : 10,073,905 B2
APPLICATION NO. : 14/312384
DATED : September 11, 2018
INVENTOR(S) : Sergey Skrobotov It is certified that error appears in the above-identified patent and that said Letters Patent is hereby corrected as shown below:

On the Title Page

On page 2, in Column 2, under "Other Publications", Line 20, delete "Communciation" and insert --Communication-- therefor In the Claims In Column 26, Line 13, in Claim 1, delete "yielding," and insert --yielding-- therefor In Column 26, Line 45, in Claim 3, after "device", insert --is--

Signed and Sealed this
Second Day of July, 2019

Andrei Iancu
*Director of the United States Patent and Trademark Office*